US012610113B2

(12) United States Patent
Kawamata et al.

(10) Patent No.: US 12,610,113 B2
(45) Date of Patent: Apr. 21, 2026

(54) IMAGING APPARATUS

(71) Applicant: Hitachi, Ltd., Tokyo (JP)

(72) Inventors: Ryota Kawamata, Tokyo (JP); Keiichi Betsui, Tokyo (JP); Kazuyoshi Yamazaki, Tokyo (JP); Rei Sakakibara, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 24 days.

(21) Appl. No.: 18/687,996

(22) PCT Filed: Aug. 4, 2022

(86) PCT No.: PCT/JP2022/029927
§ 371 (c)(1),
(2) Date: Feb. 29, 2024

(87) PCT Pub. No.: WO2023/119709
PCT Pub. Date: Jun. 29, 2023

(65) Prior Publication Data
US 2024/0388778 A1      Nov. 21, 2024

(30) Foreign Application Priority Data
Dec. 23, 2021      (JP) ................................. 2021-209419

(51) Int. Cl.
*H04N 23/51*          (2023.01)
*B60Q 1/00*           (2006.01)
(Continued)

(52) U.S. Cl.
CPC ........... *H04N 23/51* (2023.01); *B60Q 1/0023* (2013.01); *H04N 13/239* (2018.05); *H04N 23/54* (2023.01); *H04N 23/57* (2023.01); *H04N 23/90* (2023.01)

(58) Field of Classification Search
CPC ...... H04N 23/51; H04N 13/239; H04N 23/54; H04N 23/57; H04N 23/90; H04N 23/00;
(Continued)

(56) References Cited

U.S. PATENT DOCUMENTS

2006/0268103 A1      11/2006   Kweon et al.
2015/0319409 A1*     11/2015   Imamura ................ H04N 23/90
                                                            348/335
(Continued)

FOREIGN PATENT DOCUMENTS

JP          2001-094842 A        4/2001
JP             4388530 B2       12/2009
(Continued)

OTHER PUBLICATIONS

Search Report mailed Oct. 4, 2022 in International Application No. PCT/JP2022/029927.
(Continued)

*Primary Examiner* — Nasim N Nirjhar
(74) *Attorney, Agent, or Firm* — Miles & Stockbridge, P.C.

(57) ABSTRACT

To suppress an influence of reflected light from a cover in an imaging apparatus. An imaging apparatus 1 includes: a first imaging unit 101 having a first viewpoint P1 and a second imaging unit 102 having a second viewpoint P2 as imaging units 100; and a light transmissive cover 2 arranged in a region intersecting at least a part of a first field of view V1 of the first imaging unit 101 and a second field of view V2 of the second imaging unit 102 in such a way as to accommodate the imaging units 100. The cover 2 has a portion having a spheroidal shape as a cover portion having a shape that reflects a light beam from a region near the first viewpoint P1 toward a region near the second viewpoint P2.

11 Claims, 14 Drawing Sheets

(51) Int. Cl.
    *H04N 13/239*       (2018.01)
    *H04N 23/54*        (2023.01)
    *H04N 23/57*        (2023.01)
    *H04N 23/90*        (2023.01)

(58) Field of Classification Search
    CPC ...... H04N 23/45; H04N 23/55; B60Q 1/0023;
               B60R 11/02; G01B 11/00; G01C 3/06;
                            G03B 15/00; G03B 35/08
    See application file for complete search history.

(56)                References Cited

U.S. PATENT DOCUMENTS

| | | |
|---|---|---|
| 2019/0230264 A1 | 7/2019 | Wakai et al. |
| 2021/0102894 A1 | 4/2021 | Kawasaki et al. |
| 2021/0231284 A1* | 7/2021 | Mano ..................... H04N 23/57 |
| 2021/0293942 A1* | 9/2021 | Kawasaki ................ G06T 7/85 |
| 2023/0031023 A1* | 2/2023 | Wang .................... H04N 23/74 |

FOREIGN PATENT DOCUMENTS

| | | |
|---|---|---|
| JP | 2015-222423 A | 12/2015 |
| WO | 2018110264 A1 | 6/2018 |
| WO | 2019130844 A1 | 7/2019 |

OTHER PUBLICATIONS

Written Opinion mailed Oct. 4, 2022 in International Application No. PCT/JP2022/029927.

\* cited by examiner

IMAGING APPARATUS

TECHNICAL FIELD

The present invention relates to an imaging apparatus.

BACKGROUND ART

For example, in implementation of automated driving of a vehicle, it is necessary to recognize an object existing in the entire periphery of an own vehicle by an image in a wide field of view and measure a distance to the object. Furthermore, for example, a security camera (in other words, a monitoring camera) installed on a ceiling, a wall, or the like is also required to acquire an image in a wide field of view. In order to perform highly reliable person tracking and accurate object dimension measurement within this field of view, not only image acquisition but also distance measurement is required.

JP 2001-094842 A (PTL 1) describes, as a method for preventing indoor reflection in an on-vehicle camera, that reflection of an upper portion of an instrument panel due to reflection on an inner side of a windshield is prevented to avoid an influence on recognition performance, and that a camera is mounted in such a way that a polarization axis of a polarizing filter of the camera has an offset angle θ with respect to a vertical direction (abstract).

JP 4388530 B2 (PTL 2) describes that a first reflection unit, a second reflection unit, a third reflection unit, and a video imaging unit are included, the second reflection unit has a hole at the center, and light reflected from the first reflection unit and light reflected from the third reflection unit simultaneously pass through the hole (claim 1).

CITATION LIST

Patent Literature

PTL 1: JP 2001-094842 A
PTL 2: JP 4388530 B2

SUMMARY OF INVENTION

Technical Problem

PTL 1 describes that the polarizing filter is used to prevent reflections caused by reflection on the inner side of the windshield at the time of imaging by an on-vehicle stereo camera. In PTL 1, there is no description about a specific shape of the windshield, and it is necessary to separately prepare the polarizing filter to be mounted on the camera.

PTL 2 describes that, for example, three hyperbolic surfaces are arranged to face each other, one camera is arranged inside one hyperbolic surface, and images from two viewpoints reflected by the three hyperbolic surfaces are captured by the one camera. As a result, a stereo camera is configured, and 360-degree omnidirectional image acquisition and distance measurement are possible. PTL 2 does not describe the shape of a cover that supports and accommodates two hyperbolic surfaces. FIG. 7 of PTL 2 illustrates a cylindrical cover of a prototype. However, a cover having such a shape causes reflections of reflected light from the cover in an acquired image as stray light. In a case where the reflected light is reflected in the image, accuracy of image recognition and distance measurement is deteriorated.

An object of the present invention is to provide a technology capable of suppressing an influence of reflected light from a cover in an imaging apparatus.

Solution to Problem

A representative embodiment of the present disclosure has the following configuration. An imaging apparatus according to an embodiment includes: a first imaging unit having a first viewpoint and a second imaging unit having a second viewpoint as imaging units; and a light transmissive cover arranged in a region intersecting at least a part of a first field of view of the first imaging unit and a second field of view of the second imaging unit in such a way as to accommodate the first imaging unit and the second imaging unit, in which the cover has a cover portion having a shape that reflects a light beam from a region near the first viewpoint toward a region near the second viewpoint.

Advantageous Effects of Invention

According to the representative embodiment of the present disclosure, it is possible to suppress an influence of reflected light from the cover in the imaging apparatus. Problems, configurations, effects, and the like other than those described above are shown in the embodiments for carrying out the invention.

BRIEF DESCRIPTION OF DRAWINGS

FIG. 4 is an explanatory view of a relationship between an imaging unit viewpoint and a cover focal point in the imaging apparatus according to the first embodiment.

FIG. 5 is an explanatory view illustrating a configuration example of light reflection suppression of the imaging unit in the imaging apparatus according to the first embodiment.

DESCRIPTION OF EMBODIMENTS

Figure 1:
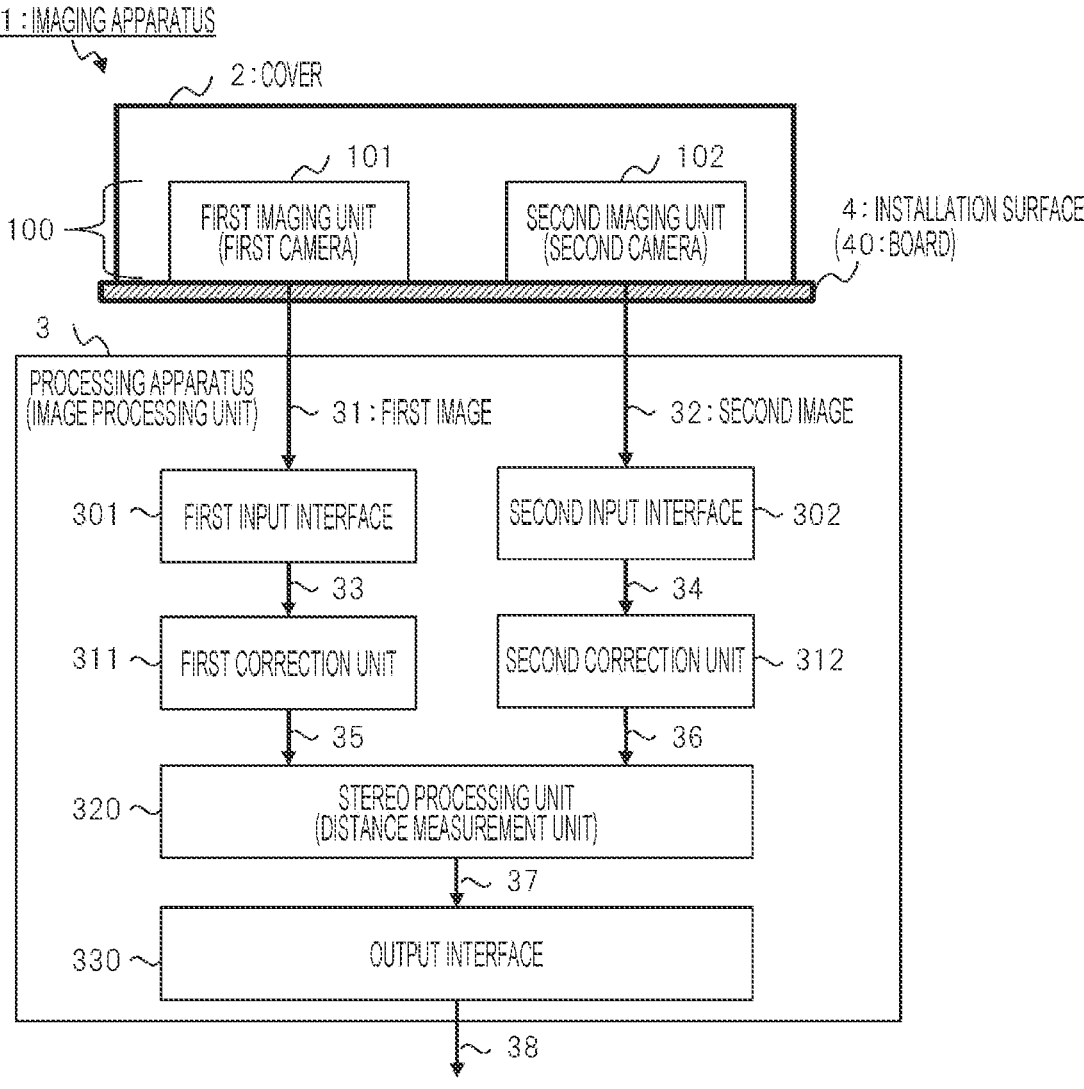
FIG. 1 is an explanatory diagram illustrating a functional block configuration example of an imaging apparatus according to a first embodiment.

Hereinafter, embodiments of the present disclosure will be described in detail with reference to the drawings. In the drawings, the same parts are denoted by the same reference signs in principle, and repeated description is omitted. In the drawings, representations of components may not represent actual positions, sizes, shapes, ranges, and the like to facilitate understanding of the invention.

In the description, in describing processing by a program, the program, a function, a processing unit, and the like may be mainly described, but main hardware therefor is a processor or a controller, an apparatus, a computer, a system, or the like configured by the processor or the like. The computer executes processing according to the program read on a memory by the processor while appropriately using resources such as the memory and a communication interface. As a result, a predetermined function, a processing unit, and the like are implemented. The processor includes, for example, a semiconductor device such as a central processing unit (CPU) or a graphics processing unit (GPU). The processor is implemented by an apparatus or circuit capable of predetermined computation. The processing is not limited to software program processing, and can be implemented by a dedicated circuit. As the dedicated circuit, a field-programmable gate array (FPGA), an application-specific integrated circuit (ASIC), a complex programmable logic device (CPLD), or the like can be applied.

The program may be installed in the target computer in advance as data, or may be distributed from a program source to the target computer as data. The program source may be a program distribution server on a communication network, or may be a non-transitory computer-readable storage medium (for example, a memory card). The program may be implemented by a plurality of modules. A computer system may be implemented by a plurality of apparatuses. The computer system may be implemented by a client server system, a cloud computing system, an IoT system, or the like. Various data and information are implemented in, for example, a structure such as a table or a list, but are not limited thereto. Representations such as identification information, an identifier, an ID, a name, and a number can be replaced with each other.

First Embodiment

An imaging apparatus according to a first embodiment of the present disclosure will be described with reference to FIGS. 1 to 5 and the like. The imaging apparatus according to the first embodiment includes a cover 2 as illustrated in FIG. 3 described below, and the cover 2 has a spheroidal shape. The cover 2 suppresses reflected light and reduces stray light incident on imaging units 100.

[Imaging Apparatus and Processing Apparatus (1)]

FIG. 1 illustrates a functional block configuration example of an imaging apparatus 1 according to the first embodiment. The imaging apparatus 1 according to the first embodiment includes a first imaging unit 101 having a first viewpoint and a second imaging unit 102 having a second viewpoint as the imaging units 100, and the cover 2, and is connected to a processing apparatus 3. In other words, the imaging unit 100 is a camera. The first imaging unit 101 is a first camera, and the second imaging unit 102 is a second camera. The cover 2 is a light transmissive member that accommodates the imaging units 100 in a space formed by the cover 2. The imaging units 100 and the cover 2 are installed on an installation surface 4 (particularly, a board 40).

The imaging apparatus 1 according to the first embodiment is particularly characterized by the cover 2 for the imaging units 100. FIG. 1 illustrates only concepts of the cover 2 and the installation surface 4, and specific shapes and the like of the cover 2 and the installation surface 4 are illustrated in FIG. 3 and the like described below. FIG. 1 also illustrates the processing apparatus 3 externally connected to the imaging apparatus 1 according to the first embodiment.

The imaging apparatus 1 is mounted on a predetermined target object, for example, a vehicle, an autonomous traveling robot, or the like. Alternatively, the imaging apparatus 1 is installed on a wall, a ceiling, or the like of a building for use as a security camera or the like. The imaging apparatus 1 according to the first embodiment can be installed on an arbitrary target object. The imaging apparatus 1 according to the first embodiment can be used as, for example, an exterior camera or an interior camera of a vehicle.

Usage/Installation Example

Figure 2A:
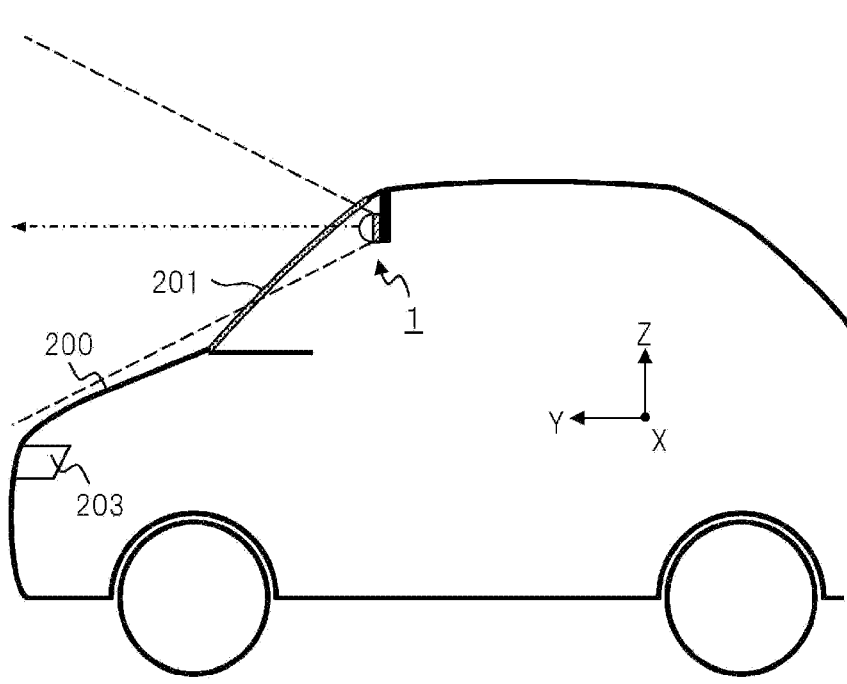
FIGS. 2A and 2B are explanatory views illustrating an example in which the imaging apparatus according to the first embodiment is mounted on a vehicle.
Figure 2B:
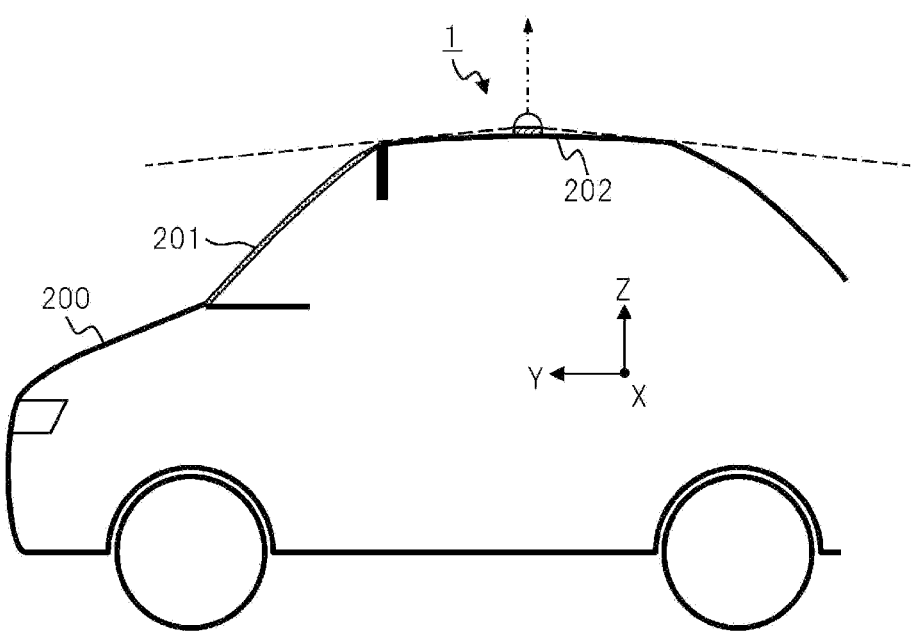
Figure 3:
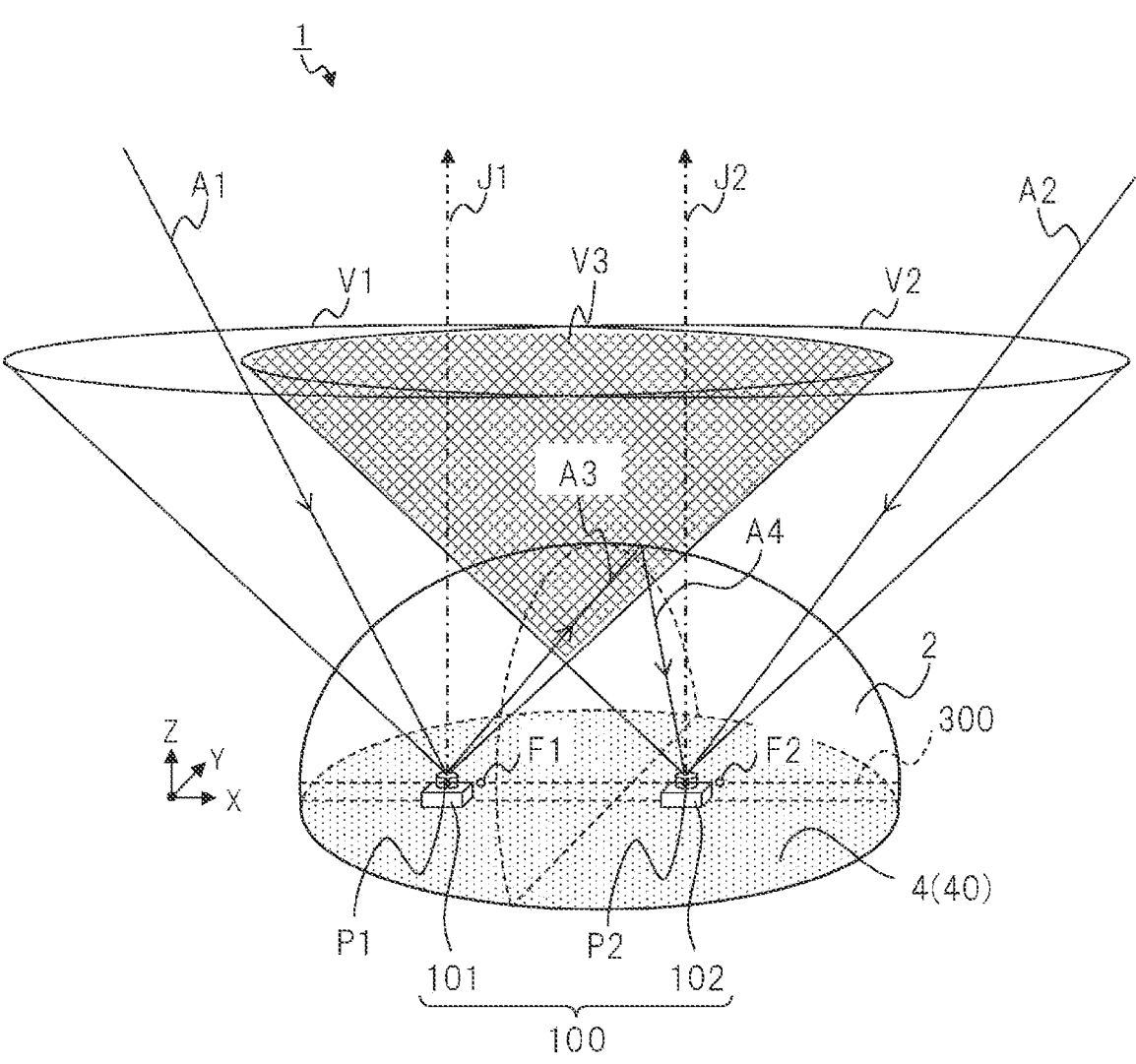
FIG. 3 is an explanatory view illustrating an example of configurations of an imaging unit and a cover in the imaging apparatus according to the first embodiment.

FIGS. 2A and 2B illustrate a specific example of use and installation of the imaging apparatus 1 according to the first embodiment, in which FIG. 2A illustrates a first example and FIG. 2B illustrates a second example. In the first example of FIG. 2A, the imaging apparatus 1 is mounted near a rearview mirror on an inner side of a windshield 201 of a vehicle 200. In this case, an optical axis direction of the imaging unit 100 in the imaging apparatus 1 is directed to a front direction (for example, a Y direction) of the vehicle 200, and the imaging apparatus 1 has a predetermined angle of view within 360 degrees around an axis in the Y direction, that is, an angle of view smaller than 180 degrees with respect to the Y axis in this example.

In the second example of FIG. 2B, the imaging apparatus 1 is mounted on, for example, an outer side and an upper side of a ceiling 202 of a vehicle body of the vehicle 200. In this case, an optical axis direction of the imaging unit 100 in the imaging apparatus 1 is directed to a vertical direction (Z direction), and the imaging apparatus 1 has a predetermined angle of view within 360 degrees around an axis in the Z direction, that is, a wide angle of 180 degrees or more with respect to the Z axis in this example. Note that the angle of view of the imaging apparatus 1 can be changed by selecting and designing angles of view of the two cameras as the imaging units 100.

The present invention is not limited to the above example, and the imaging apparatus 1 may be installed, for example, on the upper side of the ceiling of the vehicle 200 in such a way that the optical axis is directed to the front of the vehicle.

[Imaging Apparatus and Processing Apparatus (2)]

The description will return to FIG. 1. The imaging apparatus 1 is a device having at least a function of acquiring an image for object recognition and two images (in other words, stereo images) from two viewpoints for distance measurement by using the imaging units 100.

Each of the first imaging unit 101 and the second imaging unit 102 is, for example, a monocular camera. The first imaging unit 101 generates a captured image signal based on received light and outputs the captured image signal (also referred to as a first image 31). Similarly, the second imaging unit 102 generates a captured image signal based on received light, and outputs the captured image signal (also referred to as a second image 32).

In general, an image acquired by an imaging apparatus, in other words, an image captured by an imaging apparatus, is transmitted to a processing including a processor that executes processing such as target object detection (in other words, object recognition) or distance measurement using the image. In other words, the processing apparatus is an image processing unit, a computer, or the like. Examples of the processor include semiconductor devices such as a CPU and a GPU. In the first embodiment, the first image 31 and the second image 32, which are the two images acquired by the first imaging unit 101 and the second imaging unit 102 as the imaging unit 100 of the imaging apparatus 1, are transmitted to the processing apparatus 3.

In the imaging apparatus 1 according to the first embodiment, the imaging units 100 and the processing apparatus 3 are electrically connected directly via the installation surface 4, particularly the board 40, by a predetermined signal line, in other words, a communication line or a connection line. The imaging unit 100 outputs and transmits an image acquired by imaging and other information to the processing apparatus 3 through the signal line. Furthermore, the imaging unit 100 may be controlled by a control signal transmitted from the processing apparatus 3 through the signal line. Furthermore, the imaging units 100 and the processing apparatus 3 may be communicably connected via a wired or wireless communication interface.

The processing apparatus 3 in FIG. 1 includes a processor, a memory, a bus, an input/output interface, and the like. The processing apparatus 3 executes image processing including distance measurement or the like based on inputs of the first image 31 and the second image 32 which are the two images from the imaging units 100. The processing apparatus 3 has a function of outputting data and information such as the first image and the second image, which are the two images, and distance measurement information to the outside as a processing result.

Note that the imaging apparatus 1 according to the first embodiment does not include the processing apparatus 3, but is not limited thereto, and an imaging apparatus according to another embodiment may include the processing apparatus 3. The imaging apparatus in this case also has a function of executing such as processing distance measurement using two images acquired from the imaging units 100 by the processing apparatus 3. The imaging apparatus can be rephrased as a distance measurement device or the like.

The processing apparatus 3 is a unit that executes image processing for the two images as the captured image signals from the imaging units 100. The processing apparatus 3 includes a first input interface 301 and a second input interface 302 as input interfaces, a first correction unit 311 and a second correction unit 312 as correction units, a stereo processing unit 320, and an output interface 330. In other words, the stereo processing unit 320 is a distance measurement unit.

Each unit (in other words, each functional block) of the processing apparatus 3 is configured by predetermined hardware and software. Each unit may be mainly implemented by a circuit, for example, a dedicated circuit such as an FPGA, or at least a part thereof may be implemented by software program processing. For example, the stereo processing unit 320 is implemented by a processor such as a CPU executing processing according to a program on a memory. Programs and various types of data and information such as setting information are stored in advance in the memory (not illustrated) in the processing apparatus 3 or an external storage device. The processor reads and writes processing data and information from and to the memory as appropriate. Furthermore, the memory or the like stores image data of the two images acquired from the imaging units 100, image data after each processing, and the like as appropriate.

The first input interface 301 receives the first image 31 from the first imaging unit 101 and inputs the first image 31. The second input interface 302 receives the second image 32 from the second imaging unit 102 and inputs the second image 32. Each of the input interfaces includes, for example, an analog/digital converter, converts the captured image signal which is an analog signal from the imaging unit 100 into a digital signal, and outputs the digital signal to a subsequent functional block.

The first correction unit 311 and the second correction unit 312 are connected as the correction units downstream of the input interfaces. The first correction unit 311 performs correction by executing predetermined various types of image processing on the captured image signal (also referred to as a first image 33), which is the digital signal output from the first input interface 301, and then outputs the captured image signal to a subsequent functional block. Similarly, the second correction unit 312 performs correction by executing predetermined various types of image processing on the captured image signal (also referred to as a second image 34), which is the digital signal output from the second input interface 302, and then outputs the captured image signal to a subsequent functional block. The image processing executed by the correction unit is, for example, general-purpose geometric transformation. By the image processing of the geometric transformation, a captured image having distortion in a coordinate system corresponding to an imaging optical system can be transformed into an image in a predetermined coordinate system suitable for stereo processing. The image processing executed by the correction unit may also include, for example, demosaicing processing.

The stereo processing unit 320 is connected downstream of the correction units. The stereo processing unit 320 executes stereo processing, in other distance measurement processing, by using the two captured images (also referred to as a first image 35 and a second image 36) output from the correction units. The stereo processing unit 320 extracts distance information, that is, information indicating a distance between the imaging unit 100 and an object, as a result of the processing. The stereo processing unit 320 creates distance image data that is an image including the distance information (in other words, distance measurement result information). The distance image data is, for example, a distance image having a distance value for each pixel in the image, in other words, data of a distance image in which a distance to the object is expressed by color or luminance for each position coordinate in the image. Then, the stereo processing unit 320 outputs the distance image data to the output interface 330 which is a subsequent functional block. Further, the stereo processing unit 320 also outputs data of the first image 35 and the second image 36, which are the captured images from the correction units, to the output interface 330. Output data 37 is data including the distance image data and the two captured images.

The output interface 330 is connected downstream of the stereo processing unit 320. The output interface 330 outputs output data 38 corresponding to the output data 37 including the distance image data and the captured image data output from the stereo processing unit 320 to an external apparatus. Examples of the external apparatus include a control device that uses and controls the imaging apparatus 1. The external apparatus may be, for example, an electronic control unit (ECU) mounted on the vehicle 200 as illustrated in FIGS. 2A and 2B. The external apparatus may be a computer of a robot on which the imaging apparatus 1 is mounted. The external apparatus may be a server device or the like on a communication network. The output interface 330 may be a device in which a communication interface with the external apparatus is implemented. Note that, in the example of FIGS. 2A and 2B, the processing apparatus 3 of FIG. 1 may be installed integrally with the imaging apparatus 1 in the vehicle 200, or may be installed on the ECU or the like of the vehicle 200.

Comparative Example A

Figure 14:
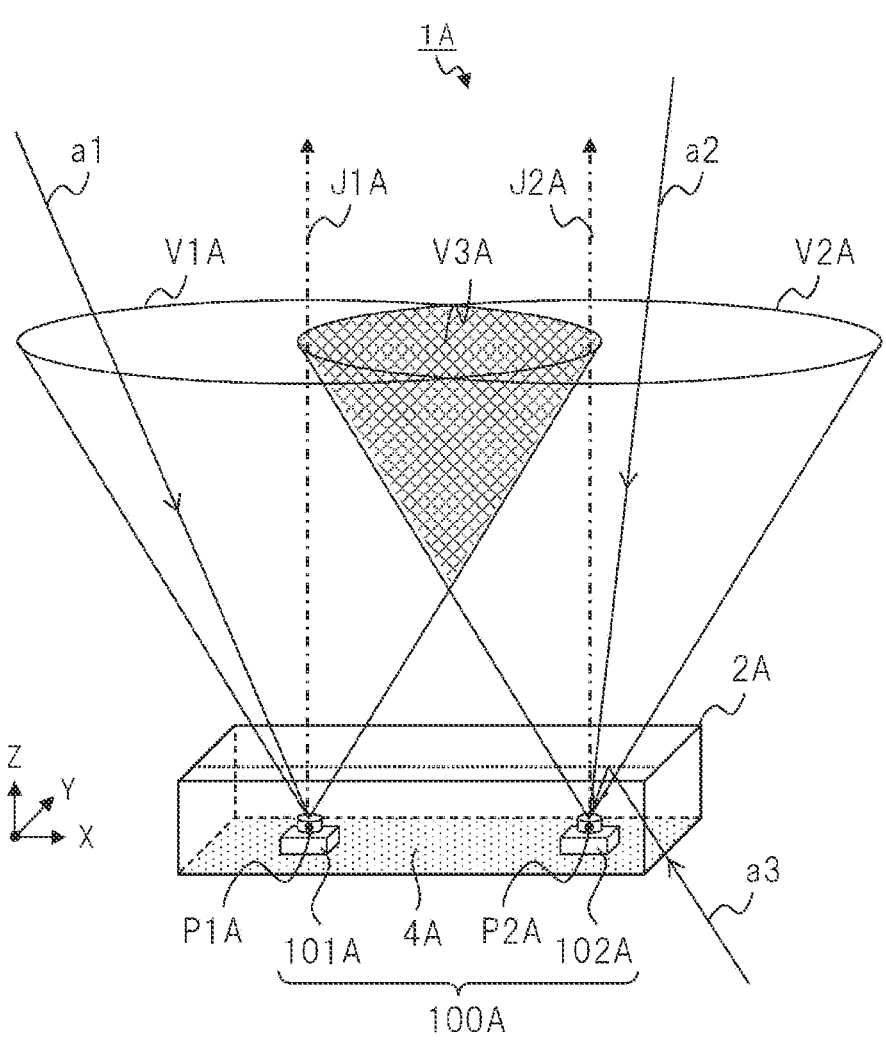
FIG. 14 is an explanatory view illustrating an example of a positional relationship between two imaging units and a cover in an imaging apparatus according to a comparative example for the first embodiment.

FIG. 14 illustrates a configuration of an imaging apparatus 1A according to a comparative example (referred to as Comparative Example A) for the imaging apparatus 1 according to the first embodiment (FIG. 3 described below). FIG. 14 is a schematic perspective view illustrating an example of a positional relationship between two cameras of imaging units 100A and a cover 2A in the imaging apparatus 1A according to Comparative Example A. The imaging apparatus 1A according to Comparative Example A includes a first imaging unit 101A and a second imaging unit 102A as the imaging unit 100A, and the cover 2A that accommodates the imaging units 100A. The imaging units 100A and the cover 2A are installed on an installation surface 4A.

The installation surface 4A is a quadrangular region indicated by a dot pattern, and is arranged on an X-Y plane illustrated in the drawing. The first imaging unit 101A and the second imaging unit 102A are installed at predetermined positions on the installation surface 4A. The first imaging unit 101A and the second imaging unit 102A are arranged at two predetermined positions at a predetermined distance on a straight line in an X direction, for example. The first imaging unit 101A has a first viewpoint P1A, and the second imaging unit 102A has a second viewpoint P2A. Optical axes of the imaging units are directed to the Z direction as indicated by an arrow with alternating long and short dashes. An optical axis J1A indicates the optical axis of the first imaging unit 101A, and an optical axis J2A indicates the optical axis of the second imaging unit 102A. A field of view V1A indicates an imaging field of view having a predetermined angle of view centered on the optical axis J1A, in this example, an angle of view of about 60 degrees on an X-Z plane. A field of view V2A indicates an imaging field of view having a predetermined angle of view centered on the optical axis J2A, in this example, an angle of view of about 60 degrees on the X-Z plane.

The cover 2A is fixed on the installation surface 4A in such a way as to cover the first imaging unit 101A and the second imaging unit 102A, which are two imaging units. In other words, the two cameras are accommodated in a space formed by the cover 2A. The shape of the cover 2A is an example of a simple rectangular parallelepiped, and has an upper surface parallel to the installation surface 4A and four side surfaces perpendicular to the installation surface 4A. One of six planes of the rectangular parallelepiped of the cover 2A that corresponds to the installation surface 4A is missing.

The first imaging unit 101A is a first camera that generates a first image that is an output image based on a light beam group from a subject in the field of view V1A toward the first viewpoint P1A of the first imaging unit 101A. The second imaging unit 102A is a second camera that generates a second image that is an output image based on a light beam group from a subject in the field of view V2A toward the viewpoint P2A of the second imaging unit 102A.

Furthermore, a common field of view V3A is illustrated as a lattice pattern region in the drawing, and is a portion where two fields of view (V1A and V2A) of two imaging units overlap each other. The common field of view V3A indicates a spatial region where stereo camera distance measurement is possible.

A light beam a1 and a light beam a2 indicate some light beams belonging to the light beam groups in the fields of view. For example, the light beam a1 indicates a light beam incident on the first viewpoint P1A downward in the Z direction in the field of view V1A of the first imaging unit 101A. The light beam a2 indicates a light beam incident on the second viewpoint P2A from downward in the Z direction in the field of view V2A of the second imaging unit 102A. Therefore, the imaging units 100A generate and acquire two images that are different output images from the first viewpoint P1A and the second viewpoint P2A that are two imaging unit viewpoints.

Here, the viewpoint or the imaging unit viewpoint or a camera viewpoint refers to an entrance pupil position in terms of the optical system. In a specific example, the viewpoint is the position of an image sensor included in the camera.

The cover 2A is a light transmissive member made of a material that transmits a wavelength of an imaging target. The cover 2A is made of a material such as glass or a resin for visible light, and is made of a material such as germanium for infrared light. The cover 2A is provided for the purpose of, for example, dustproof and drip-proof of the imaging units 100A.

Problems and the like in Comparative Example A of FIG. 14 will be described. In general, a rectangular parallelepiped shape including a plurality of planes as in the example of the cover 2A is exemplified as a shape often adopted as the cover in the imaging apparatus. In a case of the cover 2A having such a rectangular parallelepiped shape, light reflected by the cover 2A is incident on the imaging unit 100. In the example of FIG. 14, a light beam a3 is incident on the cover 2A from the outside of the two fields of view (V1A and V2A) through, for example, one side surface of the rectangular parallelepiped, is reflected downward in the Z direction by an upper plane of the rectangular parallelepiped, and is incident on the second viewpoint P2A of the second imaging unit 102A. As a result, unintended light outside the field of view (for example, the light beam a3) is mixed with light inside the field of view (for example, the light beam a2). As a result, the reflected light of the light beam a3 appears as stray light in the output image of the second imaging unit 102A. In a case where stray light appears in the output image, the accuracy of image recognition and distance measurement using the output image decreases.

Therefore, in the imaging apparatus 1 according to the first embodiment, as illustrated in FIG. 3 described below, the shape of the cover 2 is devised to prevent or suppress stray light (particularly, light reflected from the cover) caused by the mixing with light outside the field of view as described above. Specifically, in the imaging apparatus 1 according to the first embodiment in FIG. 3, the cover 2 has a spheroidal shape. As a result, such stray light is suppressed.

[Imaging Apparatus and Cover]

FIG. 3 illustrates configurations of the imaging units 100 and the cover 2 of the imaging apparatus 1 according to the first embodiment. FIG. 3 is a schematic perspective view illustrating an example of a positional relationship between two cameras serving as the imaging units 100 and the cover 2 in the imaging apparatus 1. In the example of FIG. 3, the imaging apparatus 1 is arranged in the illustrated coordinate system (X, Y, Z). The installation surface 4 is an elliptical region indicated by a dot pattern, and is arranged on the X-Y plane illustrated in the drawing. The first imaging unit 101 and the second imaging unit 102 are installed at predetermined positions on the installation surface 4. The first imaging unit 101 and the second imaging unit 102 are arranged at two predetermined positions at a predetermined distance on a straight line in the X direction, for example.

The first imaging unit 101 has a first viewpoint P1, and the second imaging unit 102 has a second viewpoint P2 on a straight line 300. Optical axes of the imaging units are directed to the Z direction as indicated by an arrow with alternating long and short dashes. An optical axis J1 indicates the optical axis of the first imaging unit 101, and an optical axis J2 indicates the optical axis of the second imaging unit 102. A field of view V1 indicates an imaging field of view having a predetermined angle of view centered on the optical axis J1, in this example, an angle of view of about 90 degrees on the X-Z plane. A field of view V2 indicates an imaging field of view having a predetermined angle of view centered on the optical axis J2, in this example, an angle of view of about 90 degrees on the X-Z plane.

The cover 2 is fixed on the installation surface 4 in such a way as to cover the first imaging unit 101 and the second imaging unit 102, which are two imaging units. In other words, the two cameras are accommodated in the space formed by the cover 2.

The cover 2 is a cover made of a light transmissive material for light (for example, visible light) as an imaging target, in other words, a protective member or a fixing member. The cover 2 has at least a function of protecting the imaging units 100, and for example, has a dustproof and drip-proof function of preventing dust and liquid from adhering to the imaging units 100. Furthermore, the cover 2 according to the first embodiment has a function of preventing or reducing incidence of stray light (that is, reflected light caused by external light other than light from a subject) on the imaging units 100.

As a basic requirement for the cover 2, it is necessary that the cover 2 does not interfere with the imaging units 100. In other words, as a condition of the size of the cover 2, it is necessary that the viewpoints (P1 and P2) of the two cameras serving as the imaging units 100 are accommodated in a space inside a schematic hemispherical surface of the cover 2.

The cover 2 has a shape in which a light beam from the vicinity of the first viewpoint P1 of the first imaging unit 101 (a cover first focal point F1 described below) is reflected by the cover 2 and travels toward the vicinity of the second viewpoint P2 of the second imaging unit 102 (a cover second focal point F2 described below), or a shape in which a light beam from the vicinity of the second viewpoint P2 is reflected by the cover 2 and travels toward the vicinity of the first viewpoint P1. More specifically, the cover 2 has a spheroidal shape, in other words, an elliptical curved surface shape, as a shape for implementing such an action.

In FIG. 3, the cover 2 occupies the space as the schematic hemispherical surface on the installation surface 4, and has a spheroidal shape as a detailed shape of the hemispherical surface. Note that, in the schematic hemispherical surface of the cover 2, an elliptical flat surface portion that is in contact with the installation surface 4 is missing, and when the imaging apparatus 1 is disassembled into the cover 2 and the like, the elliptical flat surface portion is an opening. It is sufficient if the cover 2 has a spheroidal shape in at least a part of the entire schematic hemispherical surface.

The first imaging unit 101 is the first camera that generates the first image that is an output image based on a light beam group from a subject in the field of view V1 toward the first viewpoint P1 of the first imaging unit 101. The second imaging unit 102 is the second camera that generates the second image that is an output image based on a light beam group from a subject in the field of view V2 toward the viewpoint P2 of the second imaging unit 102. Furthermore, a common field of view V3 is illustrated as a lattice pattern region in the drawing, and is a portion where two fields of view (V1 and V2) of two imaging units overlap each other. The common field of view V3 indicates a spatial region where stereo camera distance measurement is possible.

A light beam A1 and a light beam A2 indicate some light beams belonging to the light beam groups in the fields of view. For example, the light beam A1 indicates a light beam incident on the first viewpoint P1 downward in the Z direction in the field of view V1 of the first imaging unit 101. The light beam A2 indicates a light beam incident on the second viewpoint P2 downward in the Z direction in the field of view V2 of the second imaging unit 102. The imaging units 100 generate and acquire two images that are different output images from the first viewpoint P1 and the second viewpoint P2 that are two viewpoints.

A spheroidal surface of the cover 2 is a curved surface formed by rotating an elliptical curve around the straight line 300 connecting the first imaging unit 101 (particularly, the first viewpoint P1) and the second imaging unit 102 (particularly, the second viewpoint P2), which are two imaging units, as a rotation axis. Specifically, the straight line 300 as the rotation axis is a straight line connecting the first viewpoint P1 and the second viewpoint P2, which are two viewpoints, in other words, the straight line 300 is the rotation axis. In the example of FIG. 3, the straight line 300, the first viewpoint P1, and the second viewpoint P2 are positioned at a predetermined distance above the X-Y plane as the installation surface 4 in the Z direction.

Further, two focal points (F1 and F2) of the spheroidal surface of the cover 2 are the cover first focal point F1 and the cover second focal point F2. In this case, in the configuration according to the first embodiment, the two focal points (F1 and F2) are respectively aligned with, in other words, substantially aligned with, the first viewpoint P1 and the second viewpoint P2 which are the two viewpoints of the first imaging unit 101 and the second imaging unit 102 which are the two imaging units. In FIG. 3, the cover first focal point F1 is positioned near the first viewpoint P1, for example, on the right side of the first viewpoint P1 in the X direction, and the cover second focal point F2 is positioned near the second viewpoint P2, for example, on the right side of the second viewpoint P2 in the X direction. Note that a relationship between the cover first focal point F1 and the first viewpoint P1 and a relationship between the cover second focal point F2 and the second viewpoint P2 are the same as each other. For example, the cover first focal point F1 is positioned on the right side of the first viewpoint P1 in the X direction at a predetermined distance, and the cover second focal point F2 is positioned on the right side of the second viewpoint P2 in the X direction at a predetermined distance. However, the relationship is not limited thereto.

Here, alignment between the camera viewpoint and the cover focal point, which are two types of positions, means that these two points exist in the vicinity of the scale of the size of the imaging unit 100. In other words, it is sufficient if the camera viewpoint and the cover focal point are schematically aligned with each other within the scale of the size of the imaging unit 100. Details of a condition for such alignment will be described later. In a configuration in which the condition for such alignment is satisfied, a light beam from one camera viewpoint is reflected by the spheroidal shape of the cover 2 based on a characteristic of the spheroidal surface of the cover 2, and is incident on the other camera viewpoint. For example, a light beam A3 from the first viewpoint P1 of the first imaging unit 101 illustrated in the drawing is reflected by the spheroidal shape of the cover 2, and a reflected light beam A4 is incident on the second viewpoint P2 of the second imaging unit 102.

In a case where external light is incident on/reflected from an inner curved surface which is an inner surface of the cover 2, a light beam such as external light incident from a direction other than the cover focal point is reflected by the inner surface of the cover 2 and then does not travel toward the camera viewpoint in the vicinity of the cover focal point. This is due to the characteristic of the spheroidal surface. Therefore, a light beam such as external light is prevented from becoming stray light.

The shape of the spheroidal surface of the cover 2 is not limited to a mathematically exact spheroidal surface, and may be a schematic spheroidal shape. In other words, in a case where an exact spheroidal surface is used as a reference, the cover 2 may have an elliptical curved surface having a shape deviating from the reference spheroidal surface within a certain allowable range. Even in this case, the effect of suppressing reflected light from the cover 2 and the effect of reducing stray light are obtained accordingly.

[Positional Relationship and Condition for Alignment]

Figures 4, 5:
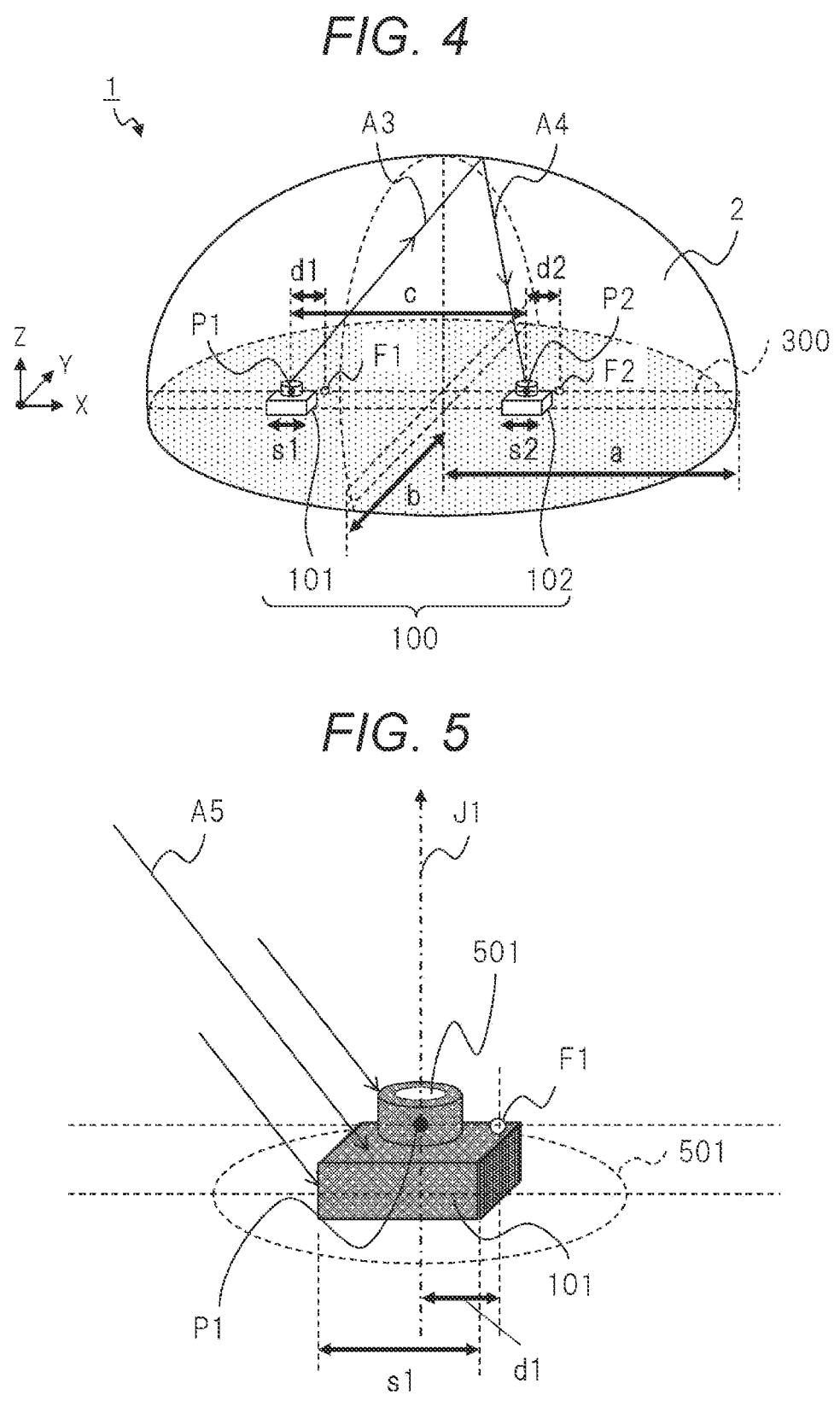

FIG. 4 is an explanatory view illustrating a positional relationship between the imaging units 100 and the cover 2 and the condition for alignment in the imaging apparatus 1 and the like according to the first embodiment in FIG. 3. In FIG. 4, a relationship between the size and shape of the cover 2 and the size and shape of the imaging unit 100, a positional relationship between the viewpoint of the imaging unit 100 and the focal point of the cover 2, and the like are illustrated using a perspective view of the cover 2 and the like similar to FIG. 3. In FIG. 4, a major axis radius which is a first radius of the spheroidal surface of the cover 2 is denoted by a, a minor axis radius which is a second radius is denoted by b, and a distance between the first viewpoint P1 and the second viewpoint P2 which are two viewpoints is denoted by c.

The size of the cover 2 is defined by two variables, the major axis radius a and the minor axis radius b. The minimum values of the two variables (a and b) can be determined by defining the following two conditions. The first condition is that the positions of the two viewpoints (P1 and P2) of the imaging units 100 and the two focal points (F1 and F2) of the cover 2 are aligned with each other. At this time, a condition of the following Expression 1 is given between the distance c between the viewpoints and the major axis radius a and the minor axis radius b.

$$c = 2\sqrt{(a^2 - b^2)} \qquad \text{Expression 1}$$

The second condition is that the first imaging unit 101 and the second imaging unit 102 included in the imaging unit 100 do not interfere with the cover 2. At this time, the lower limit values of the two variables (a and b) are determined in consideration of the sizes of the imaging units 100 and the positions of the imaging units 100. The size and scale of the first imaging unit 101 are denoted by s1, and the size and scale of the second imaging unit 102 are denoted by s2.

The values of the two variables (a and b) calculated from the condition of Expression 1 while satisfying the condition of the lower limit values are values that define the size of the cover 2 to be obtained. Since the values of the variables (a and b) are the minimum values, values larger than the minimum values may be used as long as Expression 1 is satisfied.

In FIG. 4, a distance between the first viewpoint P1 of the first imaging unit 101 and the cover first focal point F1 is d1. A distance between the second viewpoint P2 of the second imaging unit 102 and the cover second focal point F2 is d2. In this case, the above-described condition for alignment means that the distance d1 is within the scale s1 for the relationship between the first viewpoint P1 and the cover first focal point F1, and is expressed as, for example, d1≤s1 as a mathematical expression. Similarly, a relationship between the second viewpoint P2 and the cover second focal point F2 means that the distance d2 is within the scale s2, and is expressed as d2≤s2. In other words, the condition for alignment is that, for one or more imaging units, a distance between the imaging unit viewpoint and the cover focal point is equal to or less than the size of an entrance pupil (for example, a lens center region) of the imaging unit. Such a condition is derived from general optics.

The imaging apparatus 1 according to the first embodiment in FIG. 3 satisfies the above-described condition for alignment (in other words, the condition of substantial alignment) as the configurations of the imaging unit 100 and the cover 2. Note that, in the following description, for ease of understanding, it may be assumed that the viewpoint of the imaging unit 100 and the focal point of the cover 2 are at the same position, or the camera viewpoint and the cover focal point are the same as each other.

Note that, as arrangement that satisfies the above-described condition for alignment, both the first imaging unit 101 and the second imaging unit 102, which are two cameras, are arranged in a relationship having the distance d on the left side of the cover focal point in FIG. 4. The present invention is not limited thereto, and the camera focal points may be arranged in different directions or at different distances with respect to the cover focal points within a range satisfying the condition for alignment.

[Action of Cover]

The description will return to FIG. 3. In the first embodiment, actions and effects obtained by arranging the imaging units 100 and the cover 2 as described above will be described. In the arrangement of FIG. 3, for example, the light beam A4 is a light beam of cover reflected light toward the second viewpoint P2 of the second imaging unit 102, that is, the cover second focal point F2 aligned with the second viewpoint P2. The light beam A4 is reflected light corresponding to the light beam A3 emitted from the cover first focal point F1. The reflection from the light beam A3 to the light beam A4 is due to the property of the focal point of the ellipse in the spheroidal surface of the cover 2. Here, the cover first focal point F1 and the first viewpoint P1, and the cover second focal point F2 and the second viewpoint P2 satisfy the above-described condition for alignment. Therefore, the light beam A3 is light emitted from the vicinity of the first viewpoint P1 that is the entrance pupil of the first imaging unit 101. Therefore, in this case, light that may be reflected as stray light in the output image (the second image 32 in FIG. 1) of the second imaging unit 102 is limited only to light from the first viewpoint P1 that is the entrance pupil of the first imaging unit 101 and a portion of the first imaging unit 101 in the vicinity thereof.

Therefore, in the first embodiment, as illustrated in FIG. 5 described below, the most part of the first imaging unit 101 excluding an incidence region for the first viewpoint P1 is painted black, for example, in other words, a light reflection suppressing member is formed to suppress reflected light from the first imaging unit 101. As a result, reflected light such as the light beam A3 from a portion in the vicinity of the first viewpoint P1 of the first imaging unit 101 is suppressed, and the reflected light is suppressed from being reflected by the inner surface of the cover 2 and being incident on the vicinity of the second viewpoint P2 of the second imaging unit 102 like the light beam A4. As a result, stray light reflected in the output image of the second imaging unit 102 can be suppressed. Such an action similarly applies to light (for example, light beams opposite to the light beams A3 and A4) from the second imaging unit 102 to the first imaging unit 101.

In the example of FIG. 3, in a case where the light beam A1 is light of 100%, the light beam A1 is reduced to, for example, light of 10% by the action of the cover 2 when being first incident on the inside of the cover 2. The incident light of 10% is reflected by the lens of the first imaging unit 101 to become the light beam A3. At this time, the lens of the first imaging unit 101 is subjected to antireflection coating as a general configuration. Therefore, the incident light of 10% is reflected by the lens of the first imaging unit 101, and the reflected light beam A3 is reduced to light of about 1%, for example. The light beam A3 of 1% is reflected by the inner surface of the cover 2 to become the light beam A4. At this time, the light beam A3 is reflected by the inner surface of the cover 2, and the reflected light beam A4 is reduced to, for example, light of about 0.1% to 0.01%.

The light beam A4 is light that can be incident on the lens of the second imaging unit 102 and become stray light. The light beam A4 has a sufficiently small light amount of about 0.1% to 0.01% of the original light beam A1. Therefore, stray light reflected in the image of the second imaging unit 102 can be suppressed to be sufficiently small. Furthermore, the stray light can be further reduced by painting the portion other than the lens of the imaging unit 100 black.

In addition, as a modification, the cover 2 may have a configuration in which antireflection coating is applied to the inner surface of the cover 2, the inner surface being a surface exposed to an internal space of the cover 2. With this configuration, for example, reflected light at the time of reflection from the light beam A3 to the light beam A4 or the like can be further reduced.

[Configuration Example of Light Reflection Suppression of Imaging Unit]

FIG. 5 illustrates a configuration example in which the imaging unit 100 is painted black, that is, the light reflection suppressing member is formed. In the example of FIG. 5, the light reflection suppressing member is formed (for example, coated) by painting the most part of the first imaging unit 101 exposed on the installation surface 4 black except for a region of the first viewpoint P1 centered on the optical axis J1, in a specific example, a portion of the lens that forms an image on the image sensor in a housing. In FIG. 5, a lens region 501 is illustrated in white. The lens region 501 is not painted black since it is necessary for imaging. In the example of FIG. 5, a lens barrel is also painted black. In addition, a housing portion incorporating the image sensor and the like as a rectangular parallelepiped portion under the lens barrel is also painted black.

The light reflection suppressing member is a member having a low reflectance for light having a target wavelength, such as a light shielding film. By using the configuration in which such a light reflection suppressing member is provided in combination, the effect of suppressing reflected light from the cover 2 can be further enhanced.

Light incident on the first imaging unit 101, for example, a light beam A5 indicates an example of a light beam incident on an upper surface, a side surface, or the like other than the lens region 501. Even in a case where such a light beam A5 is incident, reflected light toward the cover 2, such as the light beam A3 in FIG. 3, is suppressed. Therefore, light incident on the lens region corresponding to the second viewpoint P2 of the second imaging unit 102 that is aligned with the cover second focal point F2, such as the light beam A4 in FIG. 3, is suppressed.

As a modification, the light reflection suppressing member may be provided in a region including the imaging unit and the periphery on the installation surface 4, for example, a region 501 indicated by a broken line.

[Cover Arrangement Region]

The description will return to FIG. 3. In the space, the cover 2 is arranged to have a spheroidal shape that is a predetermined shape in such a way as to include a region corresponding to some or all of the fields of view (V1 and V2) of the first imaging unit 101 and the second imaging unit 102. In other words, the cover 2 is arranged in a predetermined shape in such a way as to include an intermediate region (in other words, an intersecting region) through which some or all of light beams of the fields of view (V1 and V2) pass. In the first embodiment, as illustrated in FIG. 3, the cover 2 is arranged to have a spheroidal shape in the entire surface region of the substantially hemispherical surface on the upper side from the installation surface 4. In a part of the surface region of the substantially hemispherical surface, the fields of view (V1 and V2) intersect each other, and all the light beams of the fields of view (V1 and V2) pass.

The region and size in which the cover 2 is provided are not limited to those in the configuration example of FIG. 3, and a modification as in FIG. 6 described below is also possible. It is sufficient if at least a part of the entire cover of the imaging apparatus has a substantially spheroidal shape. The region where the cover 2 is provided in the space may be at least a part including a region where stray light caused by reflection by the cover 2 is desired to be suppressed.

[Modification: Cover]

Figure 6:
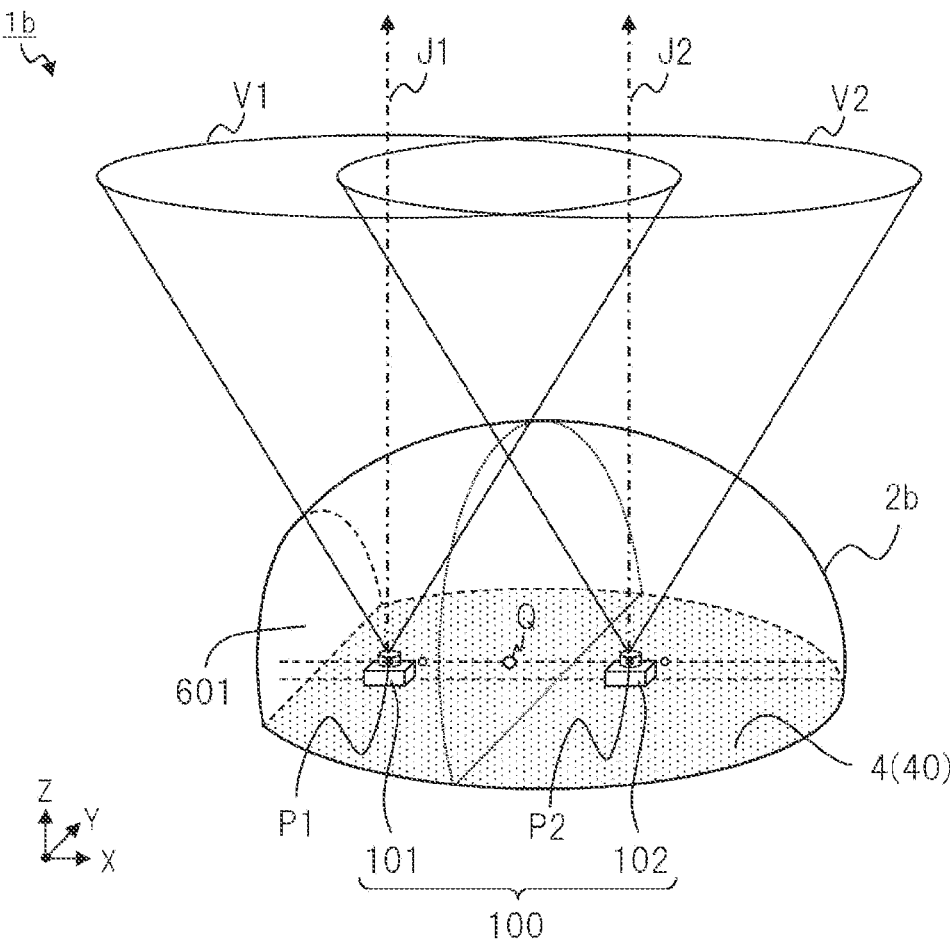
FIG. 6 is an explanatory view illustrating an example of configurations of an imaging unit and a cover in an imaging apparatus according to a modification of the first embodiment.

FIG. 6 illustrates configuration of a cover 2b and the like in an imaging apparatus 1b according to a modification of the first embodiment. The cover 2b is provided to schematically correspond to a partial region of a hemispherical surface while covering fields of view (V1 and V2) of two cameras serving as imaging units 100. Note that the example of FIG. 6 illustrates a case where the field of view of the camera is narrower than the field of view in FIG. 3. Specifically, the cover 2b has a shape in which a part of the spheroidal surface of the substantially hemispherical region in FIG. 3 is cut out. In this example, the cut portion is a portion positioned on the left side of an illustrated semi-elliptical plane 601 on the left side of the first imaging unit 101 in the X direction. The plane 601 is a Y-Z plane at a boundary between the cover 2b and the cut portion.

In the example of FIG. 6, it is assumed that there is no external light incident on the plane 601 in an installation and use environment of the imaging apparatus 1b. In this case, it is not necessary to consider reflection of external light in the partial cut region corresponding to the plane 601. Therefore, in this modification, a cover, particularly a cover having a spheroidal shape, is not provided in the partial cut region.

The plane 601 may be an opening provided with nothing, for example. In this case, basically, a space in the cover 2b is open to the outside through the plane 601. According to a usage example of the imaging apparatus 1, the plane 601 as such an opening is arranged, for example, in contact with a partial surface of a target object on which the imaging apparatus 1 is mounted, for example, the vehicle 200 of FIGS. 2A and 2B. In this case, the plane 601 closes the space in the cover 2b by the surface of the target object. In this case, a dustproof function of the cover 2b or the like is implemented.

In addition, according to the usage example, the opening of the plane 601 may be left as it is without being blocked by the surface of the target object. For example, the opening of the plane 601 may be used as a vent or may be used to arrange signal lines or other implementations. For example, in a case where the dustproof function or the like is not required, the plane 601 may remain open as described above.

As another configuration example, a flat light transmissive member may also be provided on the plane 601 to form a part of the cover 2b and close the space in the cover 2b.

[Installation Surface and Board]

The description will return to FIG. 3. In FIG. 3, the installation surface 4 on which the imaging unit 100 is installed corresponds to a bottom surface portion and an opening portion of the cover 2. The installation surface 4 is, for example, a surface of a target object on which the imaging apparatus 1 is installed, for example, a part (for example, the vehicle body or the rearview mirror) of the vehicle 200 in FIGS. 2A and 2B. Alternatively, the installation surface 4 is not a surface of the target object on which the imaging apparatus 1 is installed, but is a board or the like that is a member different from the target object as one of the components of the imaging apparatus 1. In the first embodiment, in particular, the installation surface 4 is assumed to be such a board 40. In other words, the board 40 is an imaging unit installation board or a cover bottom plate. The imaging unit 100 is fixed on the board 40. In a case where the imaging apparatus 1 is installed on the target object, the board 40 is interposed between the imaging apparatus 1 and a surface of the target object. For example, the board 40 is arranged on a surface of the target object. In the first embodiment, the entire periphery of the imaging unit 100 is surrounded by the cover 2 and the board 40 serving as the installation surface 4, so that a space in which the imaging unit 100 is accommodated is closed.

In a case where the imaging unit 100 and the cover 2 are directly installed or mounted on a surface of the target object (for example, the vehicle 200), the board 40 is unnecessary. However, in this case, the positional relationship between the imaging units 100 and the cover 2 needs to be fixed to a predetermined appropriate positional relationship on the installation surface 4. In a case where the predetermined positional relationship requires high accuracy, it is preferable to use the installation surface 4 as the board 40 as in the first embodiment.

The board 40 serving as the installation surface 4 and an end (that is, the elliptical opening portion) of the cover 2 may be fixed by any fixing means, for example, screwing, an adhesive, a fitting structure using a claw-like or spiral projection, or the like, and the cover 2 may be detachable from the board 40 at the time of maintenance or the like.

As a modification, a form in which the cover 2 and the board 40 are integrated may be adopted.

Further, the board 40 serving as the installation surface 4 is not limited in terms of optical characteristics and constituent members, and may be implemented by a light transmissive member or a light reflection suppressing member. In the first embodiment, the entire upper surface of the board 40 serving as the installation surface 4 may be implemented by a light reflection suppressing member. The light reflection suppressing member of the board 40 may be a light reflection suppressing member similar to that in FIG. 5.

In addition, in a space surrounded by the cover 2 and the installation surface 4, or in the substantially hemispherical space in FIG. 3, it is preferable that nothing is arranged other than the imaging units 100 which are two cameras in order to prevent stray light.

In addition, the processing apparatus 3 of FIG. 1 or the like may be arranged on the back side of the board 40 serving as the installation surface 4.

[Modification: Distance Measurement Device]

Figure 7:
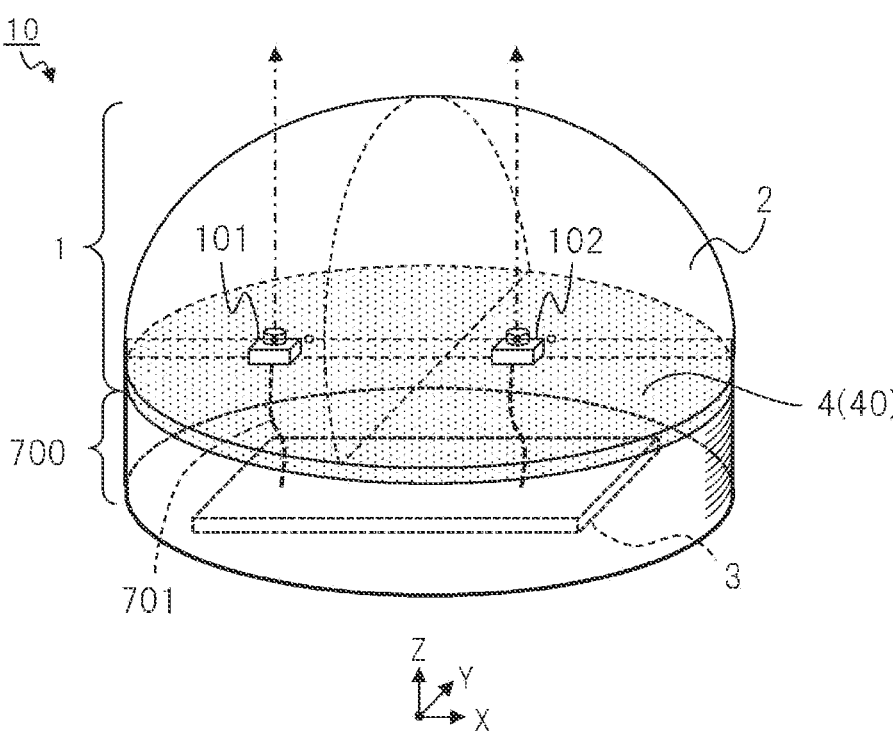
FIG. 7 is an explanatory view illustrating a configuration example of a board and a housing in the imaging apparatus according to the modification of the first embodiment.

FIG. 7 illustrates a configuration example of a distance measurement device 10 including the imaging apparatus 1 as a modification of the first embodiment. In the distance measurement device 10, a columnar or disk-shaped housing 700 is connected to the lower side of the board 40 of the imaging apparatus 1 as illustrated in FIG. 3. Then, the processing apparatus 3 and the like in FIG. 1 are provided in the housing 700. In FIG. 7, the implementation of the processing apparatus 3 is arranged on a bottom surface in the housing 700. The present invention is not limited thereto, and the implementation of the processing apparatus 3 may be arranged on a back surface of the board 40 serving as the installation surface 4 in the housing 700. The processing apparatus 3 and the like may be mounted on the board 40. In other words, the distance measurement device 10 is an imaging apparatus including the processing apparatus 3 including the stereo processing unit 320, or an imaging apparatus with a distance measuring function.

The first imaging unit 101 and the second imaging unit 102 are connected to the processing apparatus 3 through a signal line 701 via the board 40 serving as the installation surface 4. In addition, a battery, a communication interface device, and the like may be provided in the housing 700. In addition, the housing 700 may be provided with an input/output interface, an operation input button, and the like.

As another modification, the board 40 serving as the installation surface 4 may be implemented by a light transmissive member similarly to the cover 2. In this case, the board 40 serving as the installation surface 4 can also be regarded as a part of the cover 2. Furthermore, as described above, the cover 2 needs to be arranged while maintaining a predetermined positional relationship satisfying the condition for alignment as illustrated in FIGS. 3 and 4 with respect to the imaging units 100. Therefore, the cover 2 is usually fixed to the installation surface 4. However, the cover 2 is not necessarily fixed to the installation surface 4 as long as the predetermined positional relationship between the cover 2 and the imaging units 100 can be maintained.

Further, as another modification, all the cover 2, the board 40 serving as the installation surface 4, the housing 700, and the like may be formed using light transmissive members, and a light reflection suppressing member or the like may be provided only in a necessary portion.

In the examples of FIGS. 3 and 7, the board 40 serving as the installation surface 4 has an elliptical plate shape, but is not limited thereto, and may have a quadrangular plate shape or the like including an elliptical plane at the end of the cover 2. In addition, the housing 700 in FIG. 7 is not limited to a cylindrical shape, and may be a rectangular parallelepiped shape that encloses the processing apparatus 3 and the like and includes the elliptical plane at the end of the cover 2.

Effects, Etc.

In the imaging apparatus 1 according to the first embodiment, the cover 2 is devised to have a spheroidal shape, and thus, it is possible to suppress an influence of reflected light from the cover 2, and to prevent or reduce reflection of stray light in images acquired through the imaging units 100. This makes it possible to prevent or reduce a decrease in accuracy of image recognition and distance measurement. In the first embodiment, the cover 2 has a spheroidal shape, so that light (for example, the light beam A4 in FIG. 3) reflected by the cover 2 and incident on the viewpoint of one camera is limited to light (for example, the light beam A3) emitted from the vicinity of the viewpoint of the other camera. Thus, the influence of the reflected light from the cover can be suppressed.

The following is also possible as a modification of the first embodiment. In the modification, as in FIG. 2A, the imaging apparatus 1 is installed in such a way that the optical axis of the imaging unit 100 is oriented to pass through the windshield 201 of the vehicle 200. In this modification, the imaging apparatus 1 may be installed or mounted on a part of the windshield 201, and a part of the windshield 201 may be integrally configured as the cover 2. Specifically, in a curved surface of the windshield 201, a region including a portion where the fields of view (V1 and V2) of the two cameras intersect each other is configured as the cover 2 having a spheroidal shape as in FIG. 3. Similarly to FIG. 3, the portion of the cover 2 acts to suppress reflected light. For example, the vehicle 200 may include a high-performance windshield on which a camera, a sensor, or the like is mounted, or a high-performance windshield implemented as a display such as a head-up display. In this case, a configuration in which, particularly, the cover 2 of the imaging apparatus 1 as described above is mounted on a part of the high-performance windshield can be applied.

As another modification, three or more imaging units may be provided in the cover 2. For example, three cameras are arranged at predetermined intervals on a straight line on the installation surface 4, and these three cameras are covered by the cover 2. The three or more imaging units in the cover 2 are not limited to a configuration in which all the viewpoints and the cover focal points are aligned with each other, and only some of the imaging units may be arranged in such a way that the viewpoints and the cover focal points are aligned with each other according to the degree of importance of the imaging unit or the like. The three cameras may have different characteristics such as an angle of view. For example, two cameras on opposite sides among the three cameras may configure a stereo camera with predetermined angle of views, and one camera in the middle may be a camera with another angle of view. In addition, a configuration in which two cameras are arranged in the vicinity of a first position and one camera is arranged in the vicinity of a second position on the installation surface 4 is also possible.

Each of the first imaging unit 101 and the second imaging unit 102 as the imaging units 100 may have a configuration in which a lens that is a refractive optical system and an image sensor are combined, or may have a configuration of a reflective optical system in which a hyperbolic mirror is added thereto.

The cover 2 is not limited to be transparent, and may be translucent, for example. The cover 2 may have a spheroidal shape only at a portion intersecting the fields of view (V1 and V2) of the cameras and have a non-spheroidal shape at the other portion.

The imaging apparatus according to the embodiment is not limited to being installed in a vehicle, an autonomous traveling robot, or the like, and the imaging apparatus may be installed in, for example, a vehicle such as a two-wheeled vehicle, or a drone as an example of another installation location.

Second Embodiment

An imaging apparatus according to a second embodiment will be described with reference to FIG. 8. A basic configuration of the second embodiment or the like is similar to that according to the first embodiment, and hereinafter, components of the second embodiment or the like different from those according to the first embodiment will be mainly described. The second embodiment shows an example in which the imaging apparatus is installed in a headlight unit (a headlight 203 in FIGS. 2A and 2B) of a vehicle.

Figure 8:
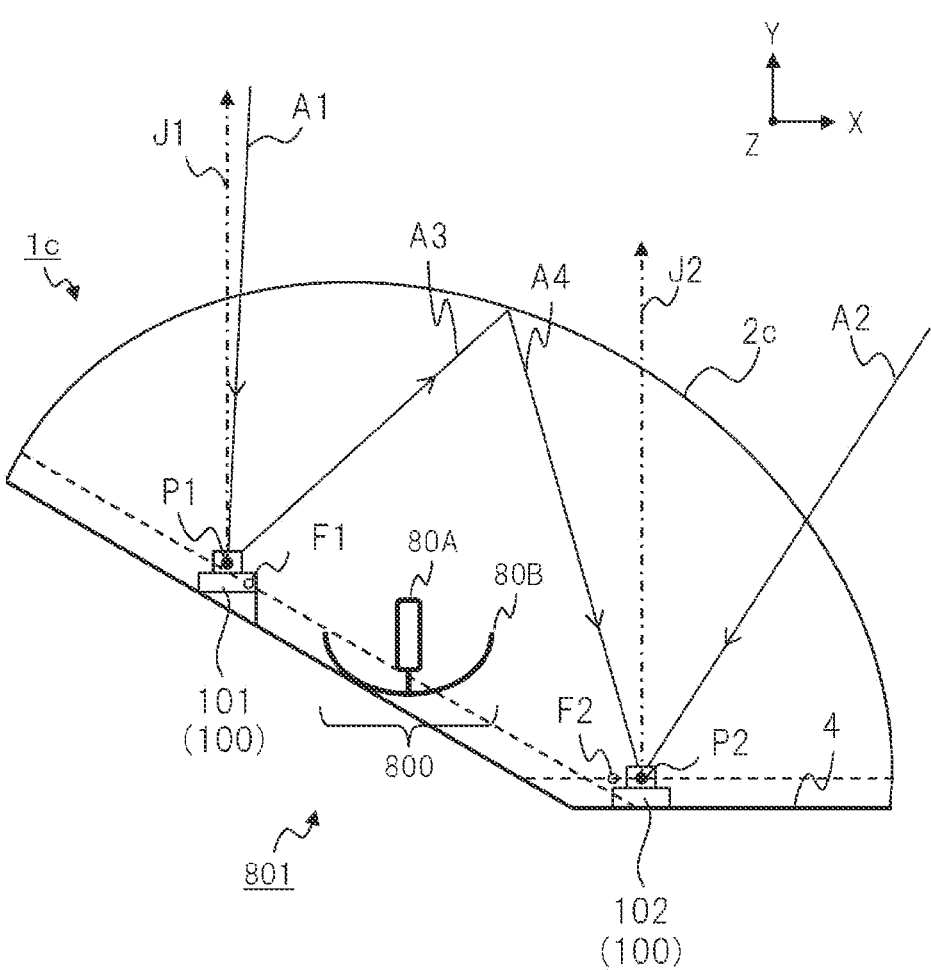
FIG. 8 is an explanatory view illustrating a configuration example in which an imaging apparatus according to a second embodiment is mounted on a headlight unit.

FIG. 8 illustrates a configuration example of an imaging apparatus 1c according to the second embodiment mounted on a headlight unit 801. FIG. 8 illustrates an example of a positional relationship among a first imaging unit 101 and a second imaging unit 102, which are two cameras serving as imaging units 100, a cover 2c, and the headlight unit 801. In FIG. 8, a Y direction is directed to the front of the vehicle, an X direction is directed to a left-right direction of the vehicle, and a Z direction is directed to a vertical direction. The imaging units 100 in the headlight unit 801 function as sensors of the vehicle.

In FIG. 8, one of the left and right headlight units 801 includes a light source apparatus 800 on an installation surface 4 (X-Z plane). Here, the installation surface 4 is a part of a vehicle body. As an example, the installation surface 4 has a plane extending in the X direction and a slope with respect to the X direction.

In a case of the headlight, in order to control a light distribution characteristic for illumination light, the periphery of each sensor (the imaging unit 100 in this example) may also be formed by a light reflecting member. The light reflecting member is a member made of a material having a high reflectance for the illumination light. In this case, light reflected by these light reflecting members may be reflected again by the cover 2c, enter the imaging unit 100 corresponding to the sensor, and become stray light.

Therefore, in the second embodiment, the sensor having a first viewpoint P1 is referred to as the first imaging unit 101, and the sensor having a second viewpoint P2 is referred to as the second imaging unit 102. Then, in the second embodiment, similarly to the first embodiment, the cover 2c and the imaging units 100 are arranged in such a way as to satisfy a condition that a cover first focal point F1 and a cover second focal point F2, which are two focal points of the cover 2c, are aligned with the first viewpoint P1 and the second viewpoint P2, which are two viewpoints of the imaging units 100. As a result, stray light caused by reflected light from the cover 2c can be suppressed. The cover 2c of the imaging apparatus 1 may be a cover of the headlight unit 801 or a part of the cover.

The installation surface 4 for the two cameras serving as the imaging units 100 is not limited to one plane, and may be a plurality of planes as in this example, a curved surface, or the like. In any aspect of the installation surface 4, it is sufficient if the cover 2c has a spheroidal shape with a relationship between the focal points (F1 and F2) of the cover 2c and the viewpoints (P1 and P2) of the two cameras satisfying the above-described condition for alignment.

The light source apparatus 800 includes, for example, a light source 80A and a reflector 80B. The reflector 80B is a device that controls a light distribution characteristic of the light source 80A. A part of light emitted from the light source 80A is reflected by the reflector 80B, collected, and emitted as a light flux toward an area in front of the vehicle.

Further, the installation surface 4 that is a part of the headlight unit 801, in other words, a headlight bottom surface portion is, for example, the light reflecting member, that is, a member made of a material having a high reflectance for light from the light source. Thus, light use efficiency of the headlight unit 801 is enhanced.

In the imaging apparatus 1c mounted on the headlight unit 801 in FIG. 8, the first imaging unit 101 and the second imaging unit 102 as the imaging units 100 are installed at predetermined positions on the left and right sides of the light source apparatus 800, for example, on the installation surface 4. Optical axes (J1 and J2) of the two cameras are oriented in the Z direction. The imaging apparatus 1c images the area in front of the vehicle with reference to the position of the headlight 203 to enable distance measurement and the like. In other words, the headlight 203 is a headlight having a stereo camera function. Although not illustrated, the imaging units 100 are connected to a processing apparatus 3 in FIG. 1 as in the first embodiment.

The cover 2c is fixed on the installation surface 4 in such a way as to cover the light source apparatus 800 and the two imaging units. As in the first embodiment, the cover 2c has a spheroidal shape in at least a partial region. The relationship between the viewpoints (P1 and P2) of the two cameras and the focal points (F1 and F2) of the cover 2c satisfies the condition for alignment as in the first embodiment. Similarly to the first embodiment (FIG. 5), the imaging units 100 may be painted black.

In FIG. 8, for example, a light beam A1 indicates an example of light incident from the outside of the cover 2c toward the first imaging unit 101. A light beam A2 indicates an example of light incident from the outside of the cover 2c toward the second imaging unit 102. A light beam A3 indicates an example of light reflected by the first imaging unit 101 and directed toward an inner surface of the cover 2c. A light beam A4 indicates an example of reflected light of the light beam A3 reflected by the inner surface of the cover 2c toward the second imaging unit 102. Similarly to the first embodiment, the light beams A3 and A4 tend to be directed toward the camera viewpoint corresponding to the cover focal point due to the spheroidal shape of the cover 2c.

With the imaging apparatus 1c according to the second embodiment, an effect of suppressing stray light as reflected light incident on the imaging unit 100 can be obtained by the shape of the cover 2c as in the first embodiment. In the configuration of FIG. 8, the installation surface 4 is formed of the light reflecting member, but even in this case, the effect of suppressing the reflected light incident on the imaging unit 100 can be obtained by the characteristic of the spheroidal surface of the cover 2c as in the first embodiment. In this configuration, in a case where external light is incident on and reflected by the installation surface 4, even if the reflected light is further reflected by the cover 2c, the reflected light is not directed to a lens (that is, an entrance pupil) of the imaging unit 100.

As a modification of the second embodiment, the imaging units 100 in the headlight unit 801 are not limited to two cameras, and may be a combination of one camera and light detection and ranging (LiDAR) (laser imaging detection and ranging), or the like. For example, the second imaging unit 102 may be implemented by a LiDAR.

Third Embodiment

An imaging apparatus according to a third embodiment will be described with reference to FIG. 9. The third embodiment shows a configuration example in a case where the imaging apparatus is installed as a security camera on a ceiling or the like of a building.

Figures 9, 10:
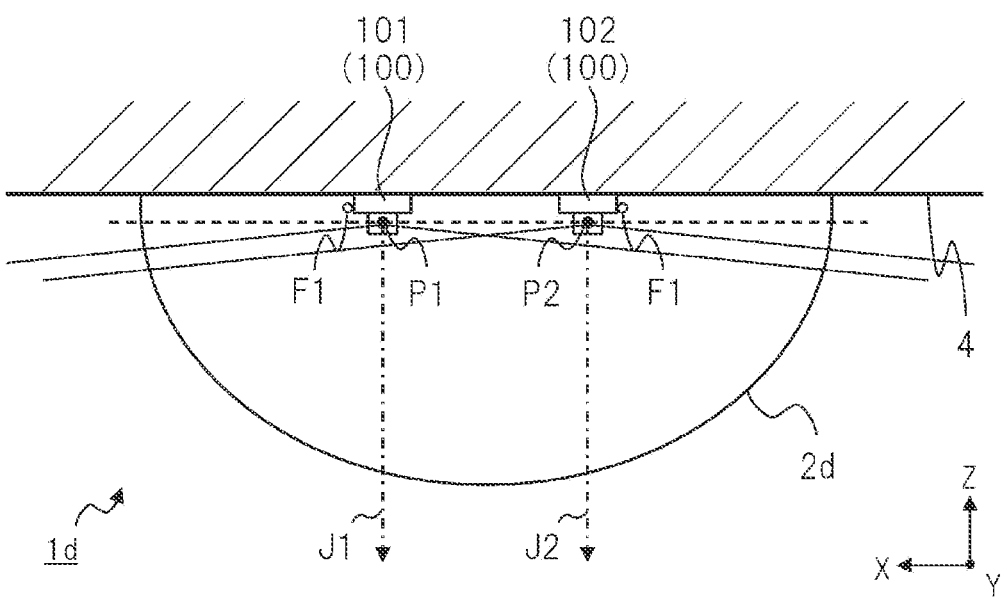
FIG. 9 is an explanatory view illustrating a configuration example in which an imaging apparatus according to a third embodiment is installed on a ceiling of a building.
FIG. 10 is an explanatory view illustrating an example of configurations of an imaging unit and a cover in an imaging apparatus according to a fourth embodiment.

FIG. 9 illustrates a configuration example in which an imaging apparatus 1d according to the third embodiment is installed on a ceiling of a building as a target object. FIG. 9 illustrates an example of a positional relationship between two cameras (a first imaging unit 101 and a second imaging unit 102) serving as imaging units 100 of the imaging apparatus 1d, a cover 2d, and an installation surface 4 of the ceiling as the target object. In FIG. 9, the installation surface 4 of the ceiling is a horizontal plane which is an X-Y plane in the drawing, and the imaging apparatus 1d is installed with optical axes of the imaging units 100 facing downward (Z direction) with respect to the installation surface 4. The imaging units 100 and the cover 2d are fixed to the installation surface 4 of the ceiling.

In the example of FIG. 9, a field of view of each camera serving as the imaging unit 100 is a wide angle close to 180 degrees with respect to the optical axis (J1 or J2). As a result, a common field of view of the two fields of view also has a wide angle close to 180 degrees with respect to an axis in the Z direction. As a result, the imaging apparatus 1d can acquire an image in a wide field of view of 360 degrees around the axis in the Z direction.

In the cover 2d, the first imaging unit 101 and the second imaging unit 102 are installed at predetermined positions on the installation surface 4. The cover 2d has a spheroidal shape as in the first embodiment. Viewpoints (P1 and P2) of the two cameras and two focal points (F1 and F2) of the cover 2d satisfy the condition for alignment as in the first embodiment. Similarly to the first embodiment (FIG. 5), the imaging units 100 may be painted black.

In this example, the installation surface 4 is a part of the ceiling, but is not limited thereto. The installation surface 4 may be a board 40 that is a part of the imaging apparatus 1d, as in the above description (FIG. 3 and the like). Further, a light reflection suppressing member may be formed on the board 40. Furthermore, in this example, the cover 2d is provided in a substantially hemispherical region with respect to the installation surface 4 that is a ceiling surface, and is provided in a region including a portion overlapping the fields of view of the two cameras.

The present invention is not limited thereto, and a part of the cover 2d may be cut out in accordance with the shape of a wall or the like that is an installation target object. A part of the cover 2d that interferes with the wall or the like may be cut out. Alternatively, the cover 2d may be arranged over a region wider than the hemisphere, for example, when the cover 2d is installed at a corner of a wall.

With the imaging apparatus 1d according to the third embodiment, an effect of suppressing stray light as reflected light incident on the imaging unit 100 can be obtained by the shape of the cover 2d as in the first embodiment.

Hitherto, a general cover in a security camera or the like has a hemispherical shape in many cases. In this case, for example, when a light emitter is installed and a glossy material and high-brightness coating are adopted for a structure such as a ceiling, external light is reflected in the two cameras serving as the imaging units. Therefore, hitherto, a design of a structure such as a ceiling is also limited.

On the other hand, according to the third embodiment, reflected light that causes external light to be reflected in one imaging unit is limited only to light generated from the vicinity of the other imaging unit due to the spheroidal shape of the cover 2d as in the first embodiment. As a result, in the third embodiment, if the above-described processing such as black painting for suppressing light emission and light reflection is performed only in the vicinity of the viewpoints (P1 and P2) of the two cameras, it is possible to apply a free design to the most part of a structure such as a ceiling.

Fourth Embodiment

An imaging apparatus according to a fourth embodiment will be described with reference to FIG. 10. In each of the above-described embodiments, the positional relationship between the shape of the cover 2 and the imaging unit 100 has been mainly described. The fourth embodiment corresponds to a modification of the first embodiment, and particularly shows a configuration example of the thickness of the cover 2.

FIG. 10 illustrates a configuration example of imaging units 100 and a cover 2e in an imaging apparatus 1e according to the fourth embodiment. FIG. 10 illustrates an example of a positional relationship between two cameras serving as the imaging units 100 and the cover 2e in an X-Z cross section. In FIG. 10, an outer surface of the cover 2e is illustrated as a cover outer surface 2e1, and an inner surface of the cover 2e is illustrated as a cover inner surface 2e2. Light directly incident on the imaging unit 100 (for example, a second imaging unit 102), for example, a light beam A41 is illustrated. The light beam A41 refracted by the cover 2e is indicated by a light beam A42 as a cover refracted light.

Comparative Example B

Figure 15:
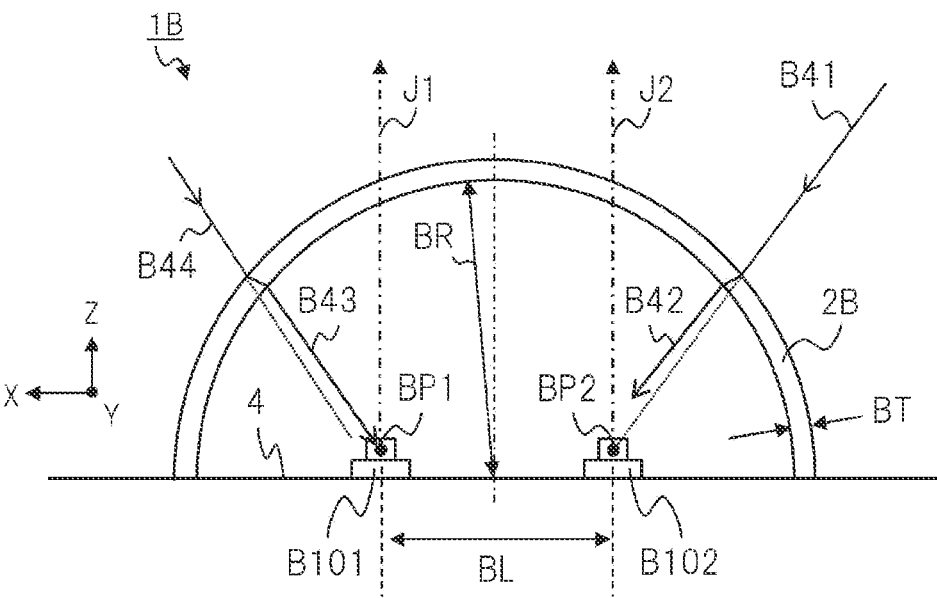
FIG. 15 is an explanatory view illustrating an example of a positional relationship between two imaging units and a cover in an imaging apparatus according to a comparative example for the fourth embodiment.

In a case where a cover of a general imaging apparatus is, for example, a cover having a hemispherical shape, the thickness of the cover is constant. FIG. 15 illustrates an X-Z cross section of a configuration example of an imaging apparatus 1B including a cover 2B having a general hemispherical shape and a constant thickness BT as a comparative example (referred to as Comparative Example B) for the fourth embodiment. The X-Z cross section of the cover 2B is semicircular and has a radius BR. In this case, in the imaging apparatus 1B, for example, a light beam B41 directed to a second viewpoint BP2 of a second imaging unit B102 is refracted by the cover 2B as illustrated in FIG. 15, and becomes a light beam B42 as a cover refracted light. However, the light beam B42 after the refraction of the light beam B41 is not necessarily directed toward the second viewpoint BP2. On the contrary, for example, as indicated by a light beam B43, light directed to a first viewpoint BP1 after the refraction by the cover 2B is not necessarily light directed to the first viewpoint P1 before the refraction like a light beam B44.

In this case, the two viewpoints that are effective imaging unit viewpoints calculated for light before the refraction vary depending on an angle of view of a subject. In a case where the effective imaging unit viewpoints vary depending on the angle of view, for example, when a first imaging unit B101 and the second imaging unit B102, which are two cameras serving as the imaging units, configure a stereo camera, a baseline length BL varies. The baseline length BL is a distance between the effective imaging unit viewpoints of the two cameras. In a case where the baseline length BL varies, calculation of distance measurement based on a captured image becomes complicated.

Therefore, in the fourth embodiment, as illustrated in FIG. 10, the cover 2e has a shape in which the thickness varies according to the position. As a result, light directed from the outside directly to the imaging unit viewpoint, for example, the second viewpoint P2, for example, the light beam A42 after the refraction of the light beam A41 by the cover 2e, is also directed to the second viewpoint P2. In other words, the cover 2e has, for example, a spheroidal surface as illustrated in FIG. 3 as a basic shape, and is designed to have a thickness corresponding to the position and location of each portion of the cover 2e in such a way as to reduce an influence of the refraction as described above. The thickness of the cover 2e is designed in such a way that light directed to the imaging unit viewpoint before the refraction is directed to the same imaging viewpoint after the refraction at each position.

Specifically, the cover 2e of FIG. 10 is required to have a thickness that decreases as the distance from the straight line 300 connecting the imaging unit viewpoints (the first viewpoint P1 and the second viewpoint P2), which is a rotation axis of the spheroidal shape, increases. In the example of FIG. 10, the thickness is T1 at a position close to the center point of the cover 2e at a large distance h1 from the straight line 300, and the thickness is T2 at a position away from the center of the cover 2e at a small distance h2 from the straight line 300. The thickness T1 is smaller than the thickness T2. In a direction (X direction) of the straight line 300 connecting the two imaging units (the first imaging unit 101 and the second imaging unit 102), the thickness (for example, the thickness T1) at a position closer to the center of the cover 2e is smaller than the thickness (for example, the thickness T2) at a position farther from the center of the cover 2e.

In the configuration of FIG. 10, either or both of the outer surface 2e1 and the inner surface 2e2 of the cover 2e deviate from the exact spheroidal shape. However, also in this case, for example, an intermediate surface 1001 (illustrated by a broken line curve) between the outer surface 2e1 and the inner surface 2e2 has a spheroidal shape similar to that according to the first embodiment. As a result, it is possible to satisfy a condition for alignment that focal points of the outer surface 2e1 and the inner surface 2e2 are aligned with the imaging unit viewpoints (P1 and P2) or the vicinity thereof.

With the imaging apparatus 1e according to the fourth embodiment, an effect of suppressing stray light as reflected light incident on the imaging unit 100 can be obtained by the shape of the cover 2e as in the first embodiment. According to the fourth embodiment, the influence of the refraction by the cover 2e can be reduced, and thus, complication of calculation of distance measurement based on a captured image can be avoided.

Fifth Embodiment

An imaging apparatus according to a fifth embodiment will be described with reference to FIG. 11 and the like. In the first to fourth embodiments described above, a configuration example in which a general camera and an optical system associated therewith are assumed as the imaging unit 100 has been described. On the other hand, in the fifth embodiment, a mode in which a specific imaging unit is adopted will be described.

Figure 11:
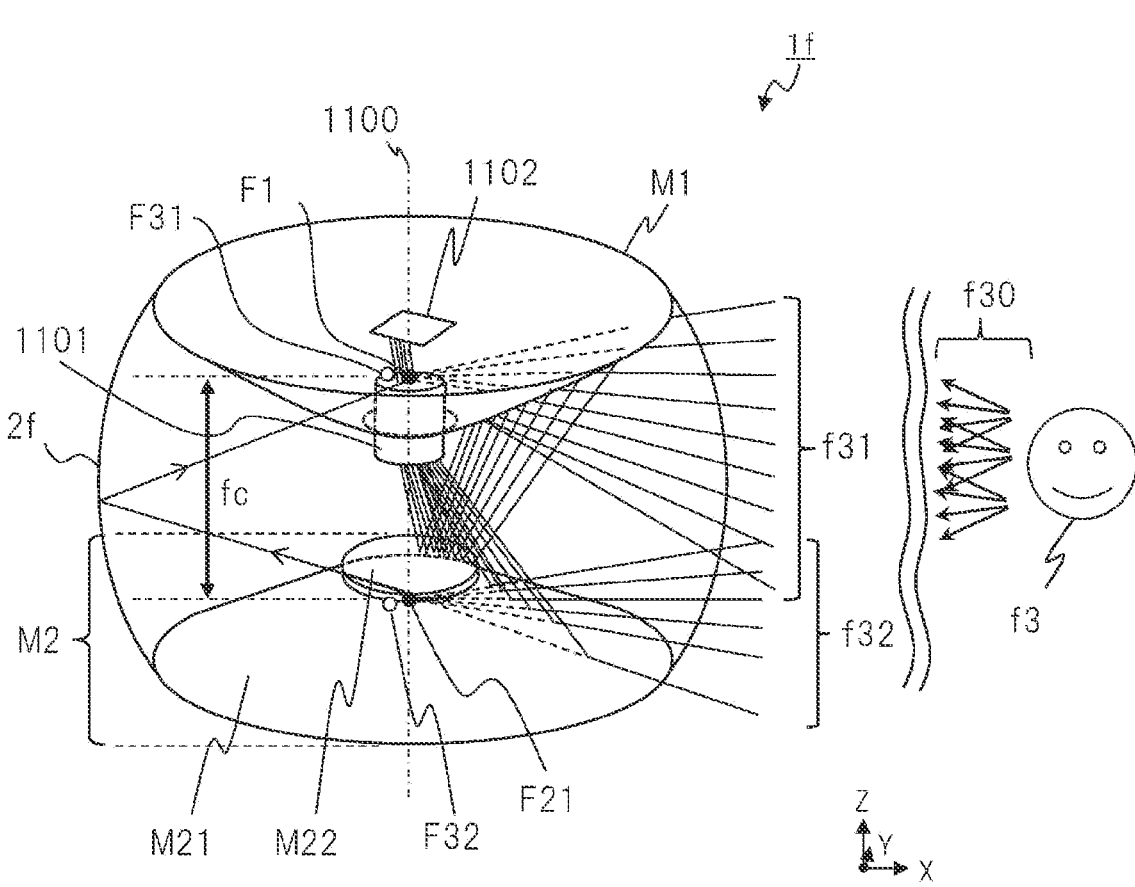
FIG. 11 is an explanatory view illustrating an example of configurations of an imaging unit and a cover in an imaging apparatus according to a fifth embodiment.

FIG. 11 illustrates an example of a positional relationship between an imaging unit and a cover 2f in an imaging apparatus 1f according to the fifth embodiment. The imaging apparatus 1f of FIG. 11 is an imaging apparatus including the imaging unit including a hyperbolic mirror, similarly to the examples of FIGS. 5C and 7 of PTL 1.

Comparative Example C

Figure 16:
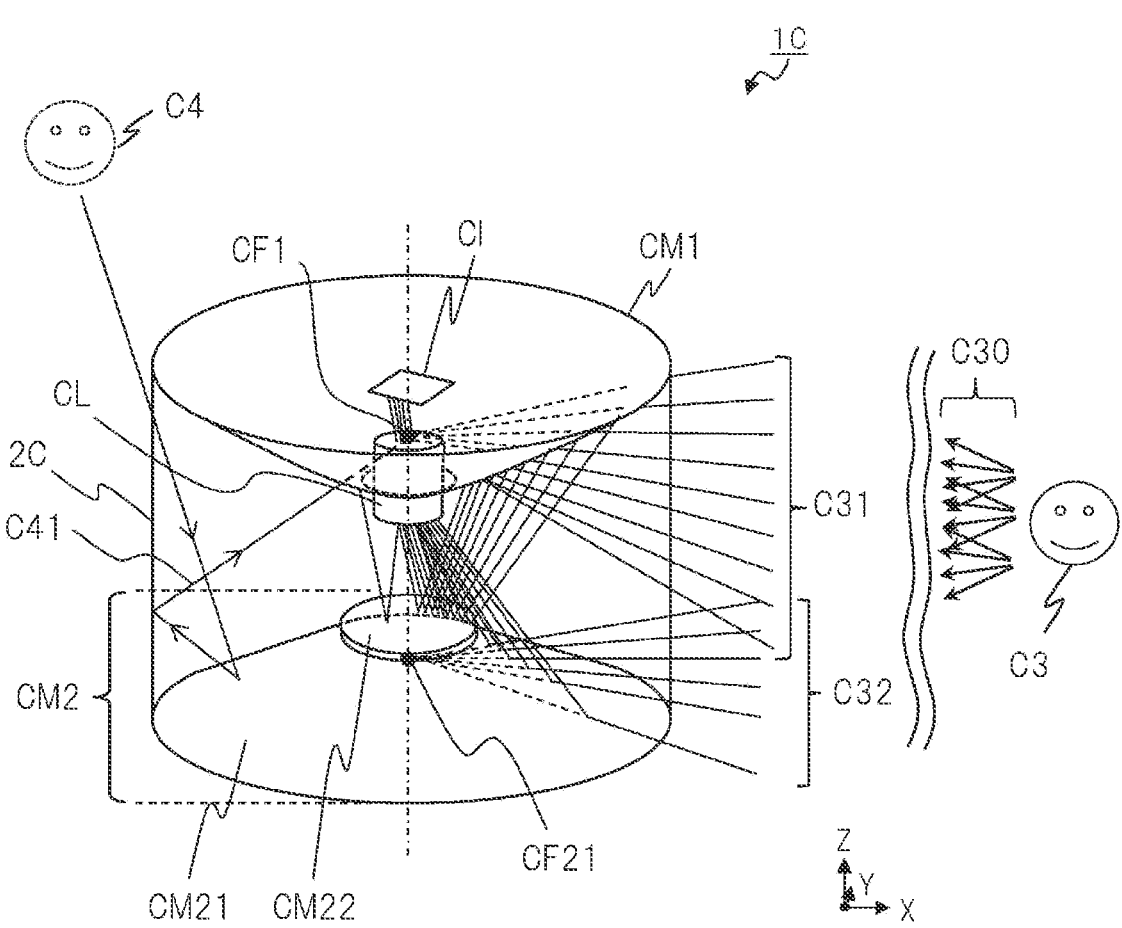
FIG. 16 is an explanatory view illustrating an example of configurations of an imaging unit and a cover in an imaging apparatus according to a comparative example for the fifth embodiment.

FIG. 16 illustrates an example of a positional relationship between an imaging unit and a cover 2C in an imaging apparatus 1C according to a comparative example (referred to as Comparative Example C) for the fifth embodiment of FIG. 11. The imaging apparatus 1C includes an upper hyperbolic mirror CM1, a lower hyperbolic mirror CM2, a lens CL, and an image sensor CI as the imaging unit. Further, the lower hyperbolic mirror CM2 includes a lower outer hyperbolic mirror CM21 and a lower inner hyperbolic mirror CM22. The imaging apparatus 1C has an axisymmetric shape with an optical axis of the lens CL as a symmetry axis (indicated by a line with alternating long and short dashes), for example.

Further, in the configuration of Comparative Example C of FIG. 16, three points, an entrance pupil of the lens CL, an outer focal point of the lower outer hyperbolic mirror CM21, and an outer focal point of the lower inner hyperbolic mirror CM22 are aligned with each other. Further, an outer focal point of the upper hyperbolic mirror CM1 and a focal point of the lower inner hyperbolic mirror CM22 are aligned with each other.

In light C30 from a subject C3, light C32 directed to a focal point CF21 of the lower outer hyperbolic mirror CM21 is reflected by the lower outer hyperbolic mirror CM21, is incident on the lens CL, and forms an image on the image sensor CI as illustrated in the drawing. Here, since the light C32 forming the image is light directed to the focal point CF21 of the lower outer hyperbolic mirror CM21, a viewpoint of the formed image is the focal point CF21. Similarly, in the light C30 from the subject C3, the light c31 directed to a focal point CF1 of the upper hyperbolic mirror CM1 is reflected by the upper hyperbolic mirror CM1 and then directed to the outer focal point of the upper hyperbolic mirror CM1 and the focal point of the lower inner hyperbolic mirror CM22 as illustrated in the drawing. The light directed to the focal point of the lower inner hyperbolic mirror CM22 is reflected again by the lower inner hyperbolic mirror CM22, and then directed to the outer focal point of the lower inner hyperbolic mirror CM22, that is, the entrance pupil of the lens CL. These rays of light form an image on the image sensor CI. Here, since the light C31 forming the image is light directed to the focal point CF1 of the upper hyperbolic mirror CM1, a viewpoint of the formed image is the focal point CF1.

As described above, in the imaging unit having the configuration of Comparative Example C, images from two viewpoints within 360 degrees around the symmetry axis (a Z axis in this example) can be acquired by one imaging unit including one set of the lens CL and the image sensor CI. Such an imaging apparatus contributes to simplification of the configuration and eventually cost reduction.

The imaging apparatus 1f according to the fifth embodiment in FIG. 11 includes the imaging unit having a configuration similar to the configuration of the imaging unit according to Comparative Example C as described above except for the cover 2f. In FIG. 11, the imaging apparatus 1f includes an upper hyperbolic mirror M1, a lower hyperbolic mirror M2, a lens 1101, and an image sensor 1102 as the imaging unit 100 of FIG. 1. Further, the lower hyperbolic mirror M2 includes a lower outer hyperbolic mirror M21 and a lower inner hyperbolic mirror M22. The imaging apparatus 1f has an axisymmetric shape with an optical axis of the lens 1101 as a symmetry axis (indicated by a line with alternating long and short dashes), for example. On the symmetry axis, the lens 1101 is arranged in an opening at a top portion of the upper hyperbolic mirror M1, and the image sensor 1102 is arranged above the lens 1101 inside the upper hyperbolic mirror M1.

In addition, an entrance pupil of the lens 1101, an outer focal point of the lower outer hyperbolic mirror M21, and an outer focal point of the lower inner hyperbolic mirror M22 are aligned with each other, in other words, satisfy a condition for the alignment. Furthermore, an outer focal point of the upper hyperbolic mirror M1 and a focal point of the lower inner hyperbolic mirror M22 are aligned with each other, in other words, satisfy the condition for alignment.

In light f30 from a subject f3, light f32 directed to a focal point F21 of the lower outer hyperbolic mirror M21 is reflected by the lower outer hyperbolic mirror M21, is incident on the lens 1101, and forms an image on the image sensor 1102 as illustrated in the drawing. Here, since the light f32 forming the image is light directed to the focal point F21 of the lower outer hyperbolic mirror M21, a viewpoint of the imaged image is the focal point F21. Similarly, in the light f30 from the subject f3, light £31 directed to a focal point F1 of the upper hyperbolic mirror M1 is reflected by the upper hyperbolic mirror M1 and then directed to the outer focal point of the upper hyperbolic mirror M1 and the focal point of the lower inner hyperbolic mirror M22 as illustrated in the drawing. The light directed to the focal point of the lower inner hyperbolic mirror M22 is reflected again by the lower inner hyperbolic mirror M22, and then directed to the outer focal point of the lower inner hyperbolic mirror M22, that is, the entrance pupil of the lens 1101. These rays of light form an image on the image sensor 1102. Here, since the light f31 forming the image is light directed to the focal point F1 of the upper hyperbolic mirror M1, a viewpoint of the formed image is the focal point F1.

A correspondence relationship of the components between the configuration according to the fifth embodiment in FIG. 11 and the configuration according to the first embodiment in FIG. 3 is as follows. For example, the first imaging unit 101 of FIG. 3 corresponds to the upper hyperbolic mirror M1, the lower inner hyperbolic mirror M22, the lens 1101, and the image sensor 1102 of FIG. 11. In other words, the component such as the hyperbolic mirror M1 of FIG. 11 is included in the first imaging unit 101. The second imaging unit 102 of FIG. 3 corresponds to the lower outer hyperbolic mirror M21, the lens 1101, and the image sensor 1102 of FIG. 11. In other words, the component such as the lower outer hyperbolic mirror M21 of FIG. 11 is included in the second imaging unit 102.

In Comparative Example C of FIG. 16, the imaging apparatus 1C includes the cover 2C having the optical axis of the lens CL as the central axis (target axis) around the imaging unit in such a way as to fix the imaging unit. The shape of the cover 2C is a cylindrical shape centered on the target axis, in other words, a shape of a side surface of a cylinder. As illustrated in FIG. 16 and FIG. 7 of Patent Literature 1, a cylindrical shape is considered as a general shape of the cover 2C in such an imaging apparatus 1C.

FIG. 16 illustrates an example of light from another subject C4 that causes stray light in addition to the light C30 from the subject C3 that is an imaging target. In Comparative Example C, for example, light C41 is included in the light from the another subject C4. The light C41 is reflected by the lower outer hyperbolic mirror CM21, then reflected again by the cover 2C, and directed to the focal point CF1 of the upper hyperbolic mirror CM1. The light C41 forms an image on the image sensor CI together with the light directed from the subject C3 directly to the focal point CF1 of the upper hyperbolic mirror CM1, and becomes stray light.

On the other hand, in the imaging apparatus 1f according to the fifth embodiment in FIG. 11, the shape of the cover 2f is based on the spheroidal shape as in the first embodiment. The cover 2f has a first focal point F31 and a second focal point F32 as focal points of the spheroidal surface. In the fifth embodiment, the positions of the two focal points (F31 and F32) of the cover 2f are aligned with imaging unit viewpoints, that is, the positions of the focal point CF1 of the upper hyperbolic mirror M1 and the focal point CF21 of the lower outer hyperbolic mirror CM21. In other words, the two focal points (F31 and F32) of the cover 2f and the two focal points (CF1 and CF21) as the imaging unit viewpoints are arranged to satisfy the above-described condition for alignment. As also illustrated in FIG. 11, the focal point F31 is in the vicinity of the focal point CF1, and the focal point F32 is in the vicinity of the focal point CF21.

With the above configuration, in the imaging apparatus 1f, for example, light that causes stray light reflected by the cover 2f and directed to the focal point CF1 of the upper hyperbolic mirror M1 is limited to only light emitted from the focal point CF21 of the lower outer hyperbolic mirror M21, and eventually, the entrance pupil of the lens 1101.

The imaging apparatus 1f according to the fifth embodiment has, in other words, the following configuration in consideration of the correspondence relationship with the imaging apparatus 1 according to the first embodiment. The imaging apparatus 1f includes the imaging unit and the light transmissive cover 2f arranged in a region intersecting at least a part of the field of view of the imaging unit in such a way as to accommodate the imaging unit. The cover 2f has a portion having a spheroidal shape as a cover portion having a shape that reflects a light beam from a region near a first viewpoint of the imaging unit toward a region near a second viewpoint. The imaging unit includes, as components, the upper hyperbolic mirror M1 (also referred to as a first reflection device), the lower outer hyperbolic mirror M21 (also referred to as a second reflection device), and the lower inner hyperbolic mirror M22 (also referred to as a third reflection device) on a first axis 1100 which is a rotational symmetry axis.

The upper hyperbolic mirror M1 is the first reflection device that reflects a first image from the focal point CF1 corresponding to the first viewpoint. The lower outer hyperbolic mirror M21 is the second reflection device that is arranged away from the first reflection device (the upper hyperbolic mirror M1) and reflects a second image from the focal point CF21 corresponding to the second viewpoint. The lower inner hyperbolic mirror M22 is the third reflective device that is arranged concentrically with the second reflective device (the lower outer hyperbolic mirror M21) and reflects the first image reflected from the first reflective device (the upper hyperbolic mirror M1). The lens 1101 is arranged concentrically with the first reflection device (the upper hyperbolic mirror M1), and forms an image including the first image reflected from the first reflection device and the third reflection device and the second image reflected from the second reflection device. The first reflection device (the upper hyperbolic mirror M1), the lens 1101, and the image sensor 1102 are included in a first imaging unit. The second reflection device (the lower outer hyperbolic mirror M21), the third reflection device (the lower inner hyperbolic mirror M22), the lens 1101, and the image sensor 1102 are included in a second imaging unit.

Also in the fifth embodiment, similarly to the above-described black painting configuration (FIG. 5), a configuration for suppressing reflected light, such as antireflection coating of the lens 1101, is provided. With this configuration, light generated from the position of the entrance pupil of the lens 1101 can be suppressed.

That is, light that causes stray light directed toward the focal point CF1 of the upper hyperbolic mirror M1 can be suppressed by combining a configuration in which an optical path of stray light is limited by the cover 2f with a configuration for suppressing reflected light of the lens 1101.

Figure 12:
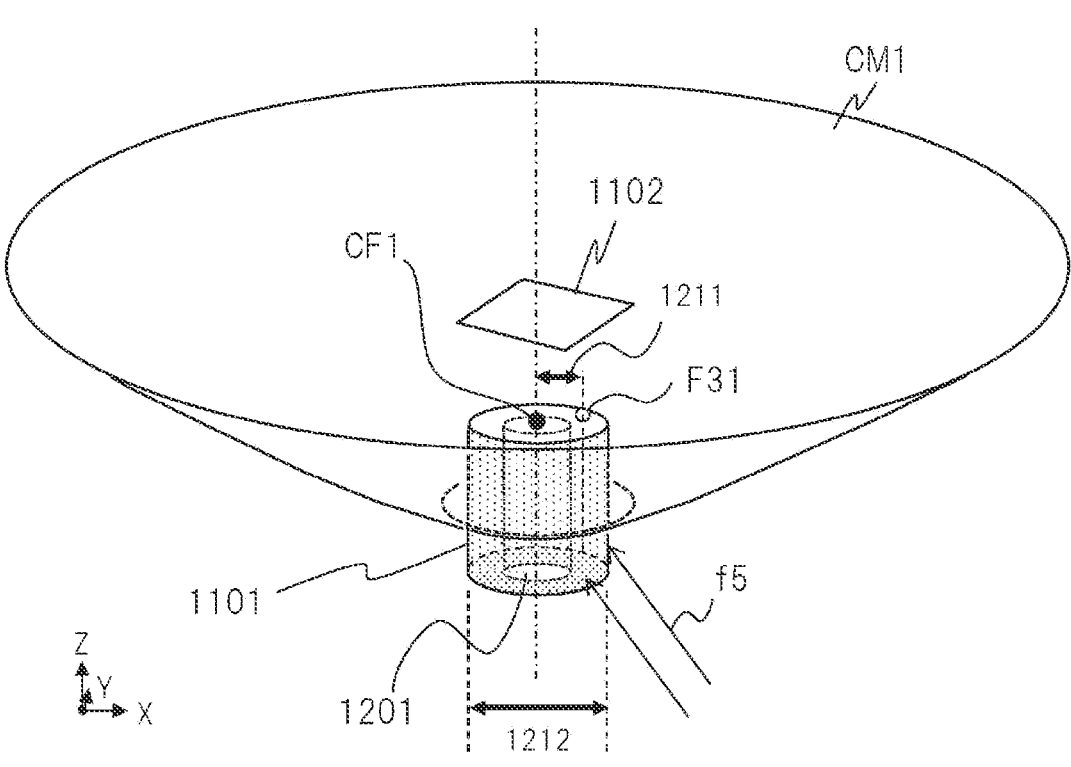
FIG. 12 is an explanatory view illustrating a configuration example of light reflection suppression of the imaging unit in the imaging apparatus according to the fifth embodiment.

FIG. 12 illustrates a configuration example of suppression of reflected light such as painting the lens 1101 black. The lens 1101 has a cylindrical shape. A portion (in other words, a central axis portion) 1201 around the symmetry axis extending in the Z direction in the drawing, which corresponds to the optical axis of the lens 1101, is a transmissive portion without providing a reflection suppressing member. The reflection suppressing member such as antireflection coating is provided on the surface of a portion outside the portion 1201. In this example, the reflection suppressing member is provided on a cylindrical portion of a side surface and a ring-shaped outer circumferential portion of a bottom surface in the surface of the cylindrical shape of the lens 1101. A light beam f5 is an example whose reflection is suppressed by the reflection suppressing member on the surface of the lens 1101.

FIG. 12 also illustrates an outline of the above-described condition for alignment. A distance 1211 is a distance between the focal point CF1 of the upper hyperbolic mirror M1 and the focal point F31 of the cover 2f, and a distance 1212 is the scale of the lens 1101. The condition for alignment is that the distance 1211 is smaller than the distance 1212 of the scale.

Although not illustrated, another comparative example includes a configuration in which a linear body extends from the center of the lower inner hyperbolic mirror toward the lens on the optical axis of the lens. In such a configuration, reflected light that does not cross the optical axis of the lens cannot be blocked. On the other hand, in the configuration of the fifth embodiment, reflected light that does not cross the optical axis of lens 1101 can also be suppressed.

As described in the first embodiment, the size of the cover 2f is defined by the distance c between the first viewpoint P1 and the second viewpoint P2, which are the imaging unit viewpoints in FIG. 4, and the sizes (s1 and s2) of the first imaging unit 101 and the second imaging unit 102, which are the imaging units 100 in FIG. 4. That is, in FIG. 11, the size of the cover 2f is defined by a distance fc between the focal point CF1 of the upper hyperbolic mirror M1 and the focal point CF21 of the lower outer hyperbolic mirror M21, and the size of the lens 1101 (the distance 1212 in FIG. 12). In the fifth embodiment, it is necessary to consider the sizes of the upper hyperbolic mirror M1 and the lower hyperbolic mirror M2 as the size of the imaging unit.

In the production of the cover 2f, for example, resin injection molding can be adopted for cost reduction. Here, for example, in a case of the shape of the cover 2f illustrated in FIG. 11, that is, a schematic barrel shape, it may be difficult to form the shape of the cover 2f as it is by injection molding. Therefore, as a method for facilitating the production by injection molding, the following can be adopted.

Figure 13A:
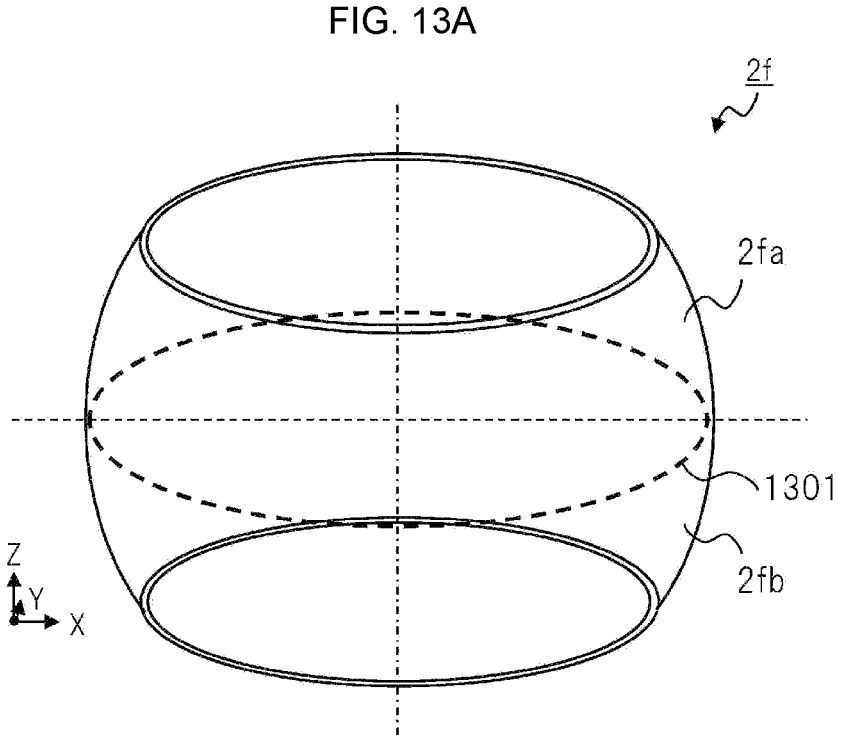
FIGS. 13A and 13B are explanatory views illustrating a configuration example related to injection molding of the cover in the imaging apparatus according to the fifth embodiment.

There is a method in which the cover 2f of FIG. 11 is divided into a cover portion 2fa and a cover portion 2fb which are upper and lower portions by a line 1301 corresponding to the position of the most bulging portion in the X and Y directions illustrated as the horizontal directions as illustrated in FIG. 13A, and the cover portion 2fa and the cover portion 2fb are injection-molded. Note that the shape of the cover 2f can also be expressed as a shape lacking upper and lower portions, that is, regions where the hyperbolic mirrors are arranged, of the spheroidal surface around the symmetry axis as the rotation axis.

However, in this method, a joint is formed in the X and Y directions which are the horizontal directions at a portion indicated by the line 1301 in the formed cover 2f. In a case where the subject moves in the horizontal direction, that is, in a case of the use for the corresponding application, the cover 2f is useful because it has a reflected light suppressing effect, from the viewpoint of not crossing the horizontal joint of the cover 2f.

Figure 13B:
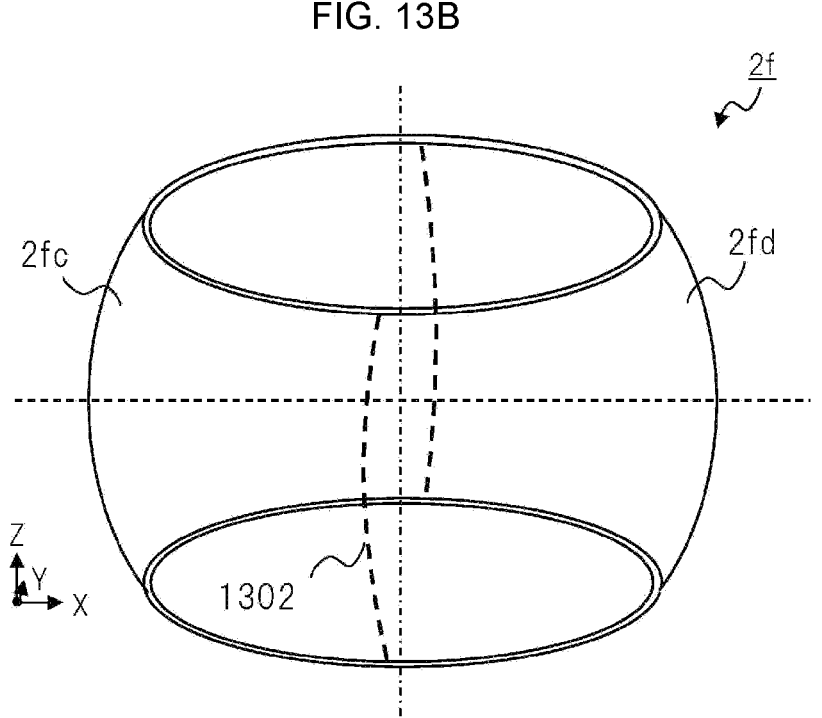

On the other hand, as illustrated in FIG. 13B, there is also a method in which the cover 2f is divided into left and right portions by a line 1302 of a vertical plane including the optical axis (symmetry axis) of the lens 1101, and each portion is injection-molded. In this method, a joint is formed in the Z direction which is the vertical direction at a portion indicated by the line 1302 in the formed cover 2f. In a case where the subject moves in the depth direction, that is, in a case of the use for the corresponding application, the cover 2f is similarly useful from the viewpoint of not crossing the vertical joint of the cover 2f. Examples of the subject moving in this manner include an obstacle falling on a road in front of a vehicle in a case where the imaging apparatus 1f is mounted on the vehicle (for example, FIG. 2A).

With the imaging apparatus 1f according to the fifth embodiment, an effect of suppressing stray light as reflected light incident on the imaging unit 100 can be obtained by the shape of the cover 2f as in the first embodiment. According to the fifth embodiment, in a case of a configuration including a specific efficient imaging unit including a hyperbolic mirror, an influence of reflected light from the cover 2f can be reduced, and the accuracy of distance measurement and the like can be enhanced.

Although the embodiments of the present disclosure have been specifically described above, the present disclosure is not limited to the above-described embodiments, and various modifications can be made without departing from the scope of the present disclosure. In the embodiments, it is possible to add, delete, and replace components except for essential components. Unless otherwise specified, each component may be plural or singular. A combination of the embodiments is also possible.

The present invention is not limited to the shapes, dimensions, positional relationships, and the like of the components described in the embodiments, and the scope of the present invention also includes those substantially similar to the shapes and the like. For example, the terms representing relationships, positions, directions, shapes, and the like of the components, such as "horizontal", "vertical", "plane", and "spheroidal surface", are not limited to their exact meanings, and can have meanings substantially the same as those meanings as long as the objects and effects of the present invention can be achieved.

The embodiments of the present disclosure are not limited to the implementation as a single imaging apparatus, and various aspects such as a vehicle on which the imaging apparatus is mounted and a building facility on which the imaging apparatus is mounted are possible in addition to the implementation as a distance measurement device or the like.

REFERENCE SIGNS LIST

1 imaging apparatus
2 cover
4 installation surface
40 board
100 imaging unit
101 first imaging unit
102 second imaging unit
P1 first viewpoint
P2 second viewpoint
F1 cover first focal point
F2 cover second focal point
J1, J2 optical axis
V1, V2 field of view
A1 to A4 light beam

The invention claimed is:

1. An imaging apparatus comprising:

a first imaging unit having a first viewpoint and a second imaging unit having a second viewpoint as imaging units; and a light transmissive cover arranged in a region intersecting at least a part of a first field of view of the first imaging unit and a second field of view of the second imaging unit in such a way as to accommodate the first imaging unit and the second imaging unit, wherein the cover has a cover portion having a shape that reflects a light beam from a region near the first viewpoint toward a region near the second viewpoint, wherein the shape of the cover portion is a spheroidal shape, wherein the first imaging unit, the second imaging unit, and the cover are arranged in such a way as to satisfy a condition that a first focal point and the first viewpoint are aligned with each other and a second focal point and the second viewpoint are aligned with each other, the first focal point and the second focal point being two focal points of the spheroidal shape of the cover portion, and wherein in the condition for alignment, d1≤s1 and d2≤s2, in which d1 is a distance between the first focal point and the first viewpoint, d2 is a distance between the second focal point and the second viewpoint, s1 is a size of the first imaging unit, and s2 is a size of the second imaging unit.

2. The imaging apparatus according to claim 1, wherein the shape of the cover portion is a convex shape in a direction perpendicular to a straight line connecting the first viewpoint and the second viewpoint.

3. The imaging apparatus according to claim 1, wherein the cover is provided in a hemispherical region on an installation surface on which the first imaging unit and the second imaging unit are installed, and the imaging apparatus further comprises, as the installation surface, a board on which the first imaging unit and the second imaging unit are installed and which is connected to the cover.

4. The imaging apparatus according to claim 1, wherein each of the first imaging unit and the second imaging unit includes a lens, and a light reflection suppressing member is provided at a portion exposed to a space in the cover other than the lens.

5. The imaging apparatus according to claim 1, wherein the imaging apparatus is installed or incorporated in a headlight of a vehicle, the headlight includes a light source on an installation surface, and a light reflecting member is provided around the light source, and the first imaging unit and the second imaging unit are installed on the installation surface of the headlight, and the cover is connected to the installation surface of the headlight.

6. An imaging apparatus comprising:

a first imaging unit having a first viewpoint and a second imaging unit having a second viewpoint as imaging units; and a light transmissive cover arranged in a region intersecting at least a part of a first field of view of the first imaging unit and a second field of view of the second imaging unit in such a way as to accommodate the first imaging unit and the second imaging unit, wherein the cover has a cover portion having a shape that reflects a light beam from a region near the first viewpoint toward a region near the second viewpoint, the imaging apparatus is installed or embedded in a ceiling or a wall of a building, the first imaging unit and the second imaging unit are installed on an installation surface of the ceiling or the wall, and the cover is connected to the installation surface of the ceiling or the wall, the cover is provided in a hemispherical region on an installation surface on which the first imaging unit and the second imaging unit are installed, the imaging apparatus further comprises, as the installation surface, a board on which the first imaging unit and the second imaging unit are installed and which is connected to the cover, and the board is provided with a light reflection suppressing member at a portion exposed to a space in the cover on a surface on which the first imaging unit and the second imaging unit are installed.

7. The imaging apparatus according to claim 1, wherein the shape of the cover portion has a thickness varying at different positions in such a way that light incident from an outside of the cover and directed to a viewpoint of the imaging unit before refraction by the cover portion is directed to the viewpoint of the imaging unit even after the refraction by the cover portion.

8. The imaging apparatus according to claim 1, wherein the first imaging unit and the second imaging unit configure a stereo camera.

9. The imaging apparatus according to claim 8, further comprising a processing apparatus that measures a distance to a subject based on a first image acquired from the first imaging unit and a second image acquired from the second imaging unit.

10. An imaging apparatus comprising:

an imaging unit; and a light transmissive cover arranged in a region intersecting at least a part of a field of view of the imaging unit in such a way as to accommodate the imaging unit, wherein the imaging unit includes, on a first axis that is a rotational symmetry axis, a first reflection device that reflects a first image from a first viewpoint, a second reflection device that is arranged away from the first reflection device and reflects a second image from a second viewpoint, a third reflection device that is arranged concentrically with the second reflection device and reflects the first image reflected from the first reflection device, a lens that is arranged concentrically with the first reflection device and forms an image including the first image reflected from the first reflection device and the third reflection device and the second image reflected from the second reflection device, and an image sensor that acquires the image formed by the lens, and the cover includes a cover portion having a shape that reflects a light beam from a region near the first viewpoint of the imaging unit toward a region near the second viewpoint.

11. The imaging apparatus according to claim 10, wherein each of the first reflection device, the second reflection device, and the third reflection device is a hyperbolic mirror.

* * * * *